(12) United States Patent
Mori

(10) Patent No.: US 8,014,148 B2
(45) Date of Patent: Sep. 6, 2011

(54) ELECTRONIC DEVICE

(75) Inventor: Takeshi Mori, Osaka (JP)

(73) Assignee: Panasonic Corporation, Osaka (JP)

( * ) Notice: Subject to any disclaimer, the term of this patent is extended or adjusted under 35 U.S.C. 154(b) by 144 days.

(21) Appl. No.: 12/391,538

(22) Filed: Feb. 24, 2009

(65) Prior Publication Data

US 2009/0219684 A1 Sep. 3, 2009

(30) Foreign Application Priority Data

Feb. 28, 2008 (JP) .................................. 2008-048474
Feb. 28, 2008 (JP) .................................. 2008-048475

(51) Int. Cl.
*G06F 1/16* (2006.01)
*H05K 7/00* (2006.01)
*H05K 5/00* (2006.01)

(52) U.S. Cl. .............. 361/679.56; 455/575.1; 455/575.8

(58) Field of Classification Search ............. 361/679.56, 361/679.01, 679.02, 679.55; 455/575.1, 455/575.8
See application file for complete search history.

(56) References Cited

U.S. PATENT DOCUMENTS

| | | | | |
|---|---|---|---|---|
| 5,046,739 A * | 9/1991 | Reichow | ................... | 273/148 B |
| 5,432,510 A * | 7/1995 | Matthews | ....................... | 341/20 |
| 5,613,223 A * | 3/1997 | Ross et al. | ................. | 455/575.1 |
| 5,764,180 A * | 6/1998 | Cummings | .................... | 341/176 |
| 5,801,918 A * | 9/1998 | Ahearn et al. | ............ | 361/679.55 |
| D413,582 S * | 9/1999 | Tompkins | ..................... | D14/344 |
| D416,256 S * | 11/1999 | Griffin et al. | ................ | D14/191 |
| 6,028,765 A * | 2/2000 | Swindler et al. | ......... | 361/679.55 |
| 6,052,279 A * | 4/2000 | Friend et al. | ............. | 361/679.32 |
| D426,204 S * | 6/2000 | Maio et al. | .................... | D14/356 |
| 6,101,086 A * | 8/2000 | Kim et al. | ................. | 361/679.55 |
| 6,134,102 A * | 10/2000 | Worn et al. | ................. | 361/679.3 |
| 6,144,552 A * | 11/2000 | Whitcher et al. | .......... | 361/679.3 |
| 6,324,557 B1 * | 11/2001 | Chan | ........................... | 708/142 |
| D453,757 S * | 2/2002 | Maio et al. | .................... | D14/340 |
| 6,359,773 B1 * | 3/2002 | Chang et al. | ............. | 361/679.09 |
| 6,394,906 B1 * | 5/2002 | Ogata | ............................. | 463/38 |
| 6,421,234 B1 * | 7/2002 | Ricks et al. | ............. | 361/679.56 |
| D467,239 S * | 12/2002 | Griesau et al. | ............... | D14/218 |
| 6,512,511 B2 * | 1/2003 | Willner et al. | ................ | 345/169 |
| 6,529,369 B1 * | 3/2003 | Zarek et al. | ............. | 361/679.09 |
| 6,560,092 B2 * | 5/2003 | Itou et al. | ................. | 361/679.55 |
| D492,282 S * | 6/2004 | Lachello et al. | ............. | D14/218 |

(Continued)

FOREIGN PATENT DOCUMENTS

JP 2001-016635 A 1/2001

(Continued)

*Primary Examiner* — Jinhee Lee
*Assistant Examiner* — Adrian S Wilson
(74) *Attorney, Agent, or Firm* — Hamre, Schumann, Mueller & Larson, P.C.

(57) ABSTRACT

An electronic device of the present invention is an electronic device including a box-shaped casing, a liquid crystal monitor 2 that is disposed on a front face 1*a* of the casing and on which visual information converted from an information signal can be displayed, and operation buttons 3 disposed near the liquid crystal monitor 2. A peripheral projection 11 projecting in the direction perpendicular to the front face 1*a* is provided on a peripheral edge portion of the front face 1*a*. The height of the peripheral projection 11 in the perpendicular direction is formed so as to be greater than the height of the operation buttons 3 with respect to the front face 1*a*. With this configuration, erroneous operation of the operating portion caused by the self-weight of the device can be prevented.

6 Claims, 15 Drawing Sheets

U.S. PATENT DOCUMENTS

| | | | |
|---|---|---|---|
| 6,765,502 B2 * | 7/2004 | Boldy et al. | 341/22 |
| 6,781,825 B2 * | 8/2004 | Shih et al. | 361/679.58 |
| 6,822,852 B2 * | 11/2004 | Von Novak | 361/679.09 |
| 6,842,333 B2 * | 1/2005 | Lee et al. | 361/679.55 |
| 6,885,314 B2 * | 4/2005 | Levin et al. | 341/20 |
| 6,894,894 B2 * | 5/2005 | Zarek et al. | 361/679.08 |
| D520,987 S * | 5/2006 | Tyson | D14/218 |
| 7,106,580 B2 * | 9/2006 | Kugimiya et al. | 361/679.22 |
| D547,361 S * | 7/2007 | Henry | D18/4.6 |
| D595,290 S * | 6/2009 | Takemasa | D14/346 |
| D595,291 S * | 6/2009 | Takemasa | D14/346 |
| D601,557 S * | 10/2009 | Wesolek | D14/341 |
| 7,684,176 B2 * | 3/2010 | Shimamoto et al. | 361/679.08 |
| 7,775,438 B2 * | 8/2010 | Beckhusen et al. | 235/472.01 |
| 2004/0023696 A1 * | 2/2004 | Kim | 455/566 |
| 2006/0042996 A1 * | 3/2006 | Picot et al. | 206/586 |
| 2007/0113098 A1 * | 5/2007 | Croley | 713/186 |

FOREIGN PATENT DOCUMENTS

| | | |
|---|---|---|
| JP | 2002-006988 A | 1/2002 |
| JP | 2003-198703 A | 7/2003 |
| JP | 2003-330599 A | 11/2003 |
| JP | 2004-207963 A | 7/2004 |
| JP | 2005-136725 A | 5/2005 |
| JP | 2005-228054 A | 8/2005 |
| JP | 2006-074716 A | 3/2006 |

* cited by examiner

ELECTRONIC DEVICE

BACKGROUND OF THE INVENTION

1. Field of the Invention

The present invention relates to an electronic device capable of processing various types of information.

2. Description of Related Art

Conventionally, for an electronic device such as a personal digital assistant (PDA), in general, all elements are disposed on only one surface of a casing of the device in order not to impair operability. However, recently, while the miniaturization of PDAs is a requirement, the demand for the size of the display area of a liquid crystal monitor to be made larger has grown since functions for viewing video content have been installed. Accordingly, it is becoming difficult to secure space in which to dispose various operating units such as cursor keys and number input keys.

In order to solve the above problem, configurations as disclosed in Patent Document 1 (JP2002-6988A) and Patent Document 2 (JP2003-198703A) have been proposed. In Patent Document 1, a configuration in which an operating unit to which major functions of an electronic device are assigned is disposed on a front side of the casing of the device and an operating unit to which auxiliary functions are assigned is disposed on another side (e.g. back side) is disclosed. In Patent Document 2, a configuration in which operation buttons respectively are disposed on both sides of a mobile phone is disclosed.

However, in the configurations disclosed in Patent Documents 1 and 2, since both sides of the device are provided with operation buttons, when placing the device on a flat surface of a desk or the like, operation buttons disposed on either the front or back side come into contact with the flat surface, resulting in erroneous operation caused by such operation buttons being pressed by the self-weight of the device.

SUMMARY OF THE INVENTION

Therefore, with the foregoing in mind, it is an object of the present invention to provide an electronic device in which erroneous operation of an operating portion caused by the self-weight of the device can be prevented from occurring.

An electronic device of the present invention includes a casing that has been formed to be box-shaped including a front casing and a back casing, a display unit that is disposed on a front main face of the front casing and on which visual information converted from an information signal can be displayed, and a main operating unit that is disposed near the display unit. A peripheral projection projecting in a direction perpendicular to the front main face is provided on a peripheral edge portion of the front main face, and the peripheral projection is formed so that a height in the perpendicular direction is greater than that of the main operating unit with respect to the front main face.

According to the present invention, even when the device is placed in a manner such that a side on which a main operating unit and/or sub-operating unit is disposed faces a flat surface of a desk or the like, erroneous operation of the operating unit caused by the self-weight of the device can be suppressed.

DETAILED DESCRIPTION OF THE INVENTION

Figure 1:
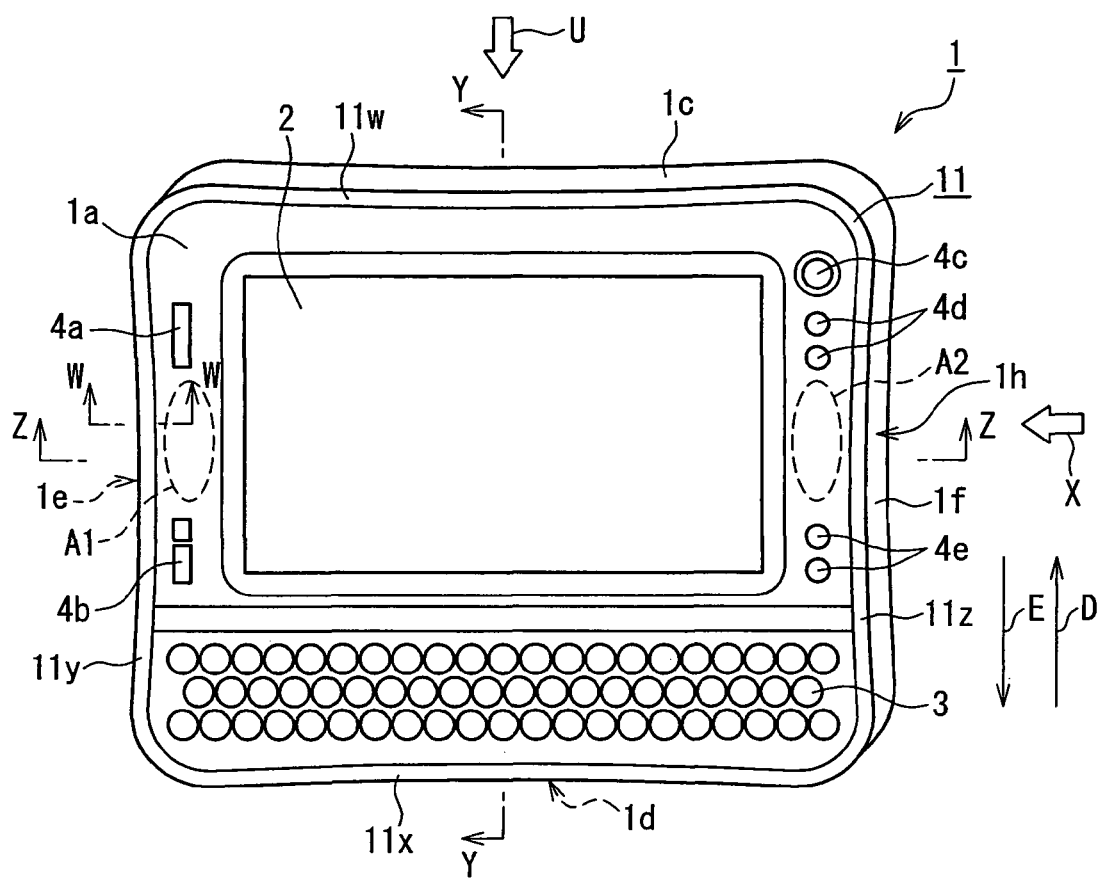
FIG. 1 is a perspective view of the external appearance of an electronic device according to Embodiment 1.

Hereinafter, the present invention will be described by way of illustrative embodiments with reference to the drawings.

An electronic device of the present invention includes a casing that has been formed to be box-shaped including a front casing and a back casing, a display unit that is disposed on a front main face of the front casing and on which visual information converted from an information signal can be displayed, and a main operating unit that is disposed near the display unit. A peripheral projection projecting in a direction perpendicular to the front main face is provided on a peripheral edge portion of the front main face, and the peripheral projection is formed so that a height in the perpendicular direction is greater than that of the main operating unit with respect to the front main face. With this configuration, even when the device is placed in a manner such that the display unit side faces a flat surface of a desk or the like, erroneous operation caused by the main operating unit contacting the flat surface of a desk or the like, and scratching of the display unit or the like can be prevented, because a space can be formed between the display unit and the desk. In addition, by forming a peripheral projection, the ability of a hand holding the electronic device to grip the device can be improved, and the device can be held reliably.

The electronic device of the present invention can be configured so that the front casing includes bowed portions formed so as to be bowed inward toward the display unit that are respectively formed on a pair of sides facing each other that form a peripheral edge constituting a perimeter of the front main face. With this configuration, when the electronic device is handheld, the position of a hand holding the device can be stably maintained on the bowed portion. Thus, for example, the electronic device can be restricted from shifting in the surface direction of the front main face, and the electronic device can be prevented from being accidentally dropped.

The electronic device of the present invention can be configured so as to include a sub-operating unit that is disposed on the back casing, and a surrounding projection that is formed around the sub-operating unit in a projecting manner in a direction perpendicular to a back main face of the back casing parallel to the front main face, and the two sub-operating units respectively are disposed as a pair close to a pair of end sides facing each other on the back main face. With this configuration, when a user is holding the present device in a manner such that the front main face of the front casing is opposing the user, although the sub-operating unit disposed on the back main face cannot be seen, the position of the surrounding projection can be distinguished by touching it with a fingertip, and the position of the sub-operating unit can be distinguished. Accordingly, the sub-operating unit can be operated by touch. By also providing the surrounding projection, even when the electronic device is placed in a manner such that the back main face faces a desk or the like, erroneous operation of the sub-operating unit caused by the self-weight of the electronic device can be prevented.

The electronic device of the present invention can be configured so that the sub-operating unit includes a projecting portion near a central portion of an operating surface for operating the sub-operating unit, the projecting portion being formed higher than the operating surface. With this configuration, when a user is holding the present device in a manner such that the front main face of the front casing is opposing the user, although the sub-operating unit disposed on the back main face cannot be seen, the position of the projecting portion can be distinguished by touching it with a fingertip, and the position of the sub-operating unit can be distinguished. Accordingly, when the user operates the sub-operating unit by touch, the operating surface of the sub-operating unit can be distinguished reliably, and the operability of the sub-operating unit can be improved.

The electronic device of the present invention can be configured so that the surrounding projection includes a top portion formed so as to be higher than the operating surface of the sub-operating unit with respect to the back main face or higher than the projecting portion. With this configuration, when the present device is placed on a desk or the like in a manner such that the back main face faces downward, the surrounding projection comes into contact with the desk while the top of the projecting portion does not come into contact with the desk or comes into contact with the desk, but only is pressed to just an extent that does not operate the switch element disposed under the sub-operating unit. Thus, erroneous operation of the sub-operating unit caused by the self-weight of the present device can be prevented.

The electronic device of the present invention can be configured so that a same function is assigned to the sub-operating units disposed as a pair. With this configuration, the electronic device can be held with one hand and operated, and erroneous operation (pressing a wrong button) will not occur even when the device is held with both hands.

The electronic device of the present invention can be configured so that the back casing includes a recessed surface portion sunken in a depressed manner with respect to the back main face that is formed on a substantially central portion of the back main face facing the front main face. With this configuration, by contacting the end of a user's finger with the inner surface of the recessed surface portion when the device is held, the ability of a hand holding the electronic device to grip the device can be improved.

The electronic device of the present invention can be configured so that the front casing includes bowed portions bowed inward that are formed on a pair of lateral sides facing each other that form a peripheral edge constituting a perimeter of the front main face, the back casing includes a recessed surface portion sunken in a depressed manner with respect to a back main face, that is formed on a substantially central portion of the back main face opposite the front main face, and the casing includes a flat portion on an area on the front main face with which a first digit can be in contact when at least the ends of a second digit, third digit, fourth digit, and fifth digit of an operator are positioned on the recessed surface portion, at least a palm of the operator is positioned so as to be in contact with or opposing the bowed portion and at least an end of the first digit of the operator is positioned so as to be in contact with the front main face. With this configuration, since the flat portion does not include the main operating unit, sub-operating unit, display unit or the like, erroneous operation of the main operating unit and/or sub-operating unit caused by contact with the first digit by chance can be prevented, and the first digit can be prevented from covering at least one portion of the display unit. Furthermore, when either of the main operating unit and sub-operating unit is not operated, what is known as a home position in which the first digit is in contact with the flat portion can be taken.

EMBODIMENT 1

1. Configuration of Electronic Device

Figure 2:
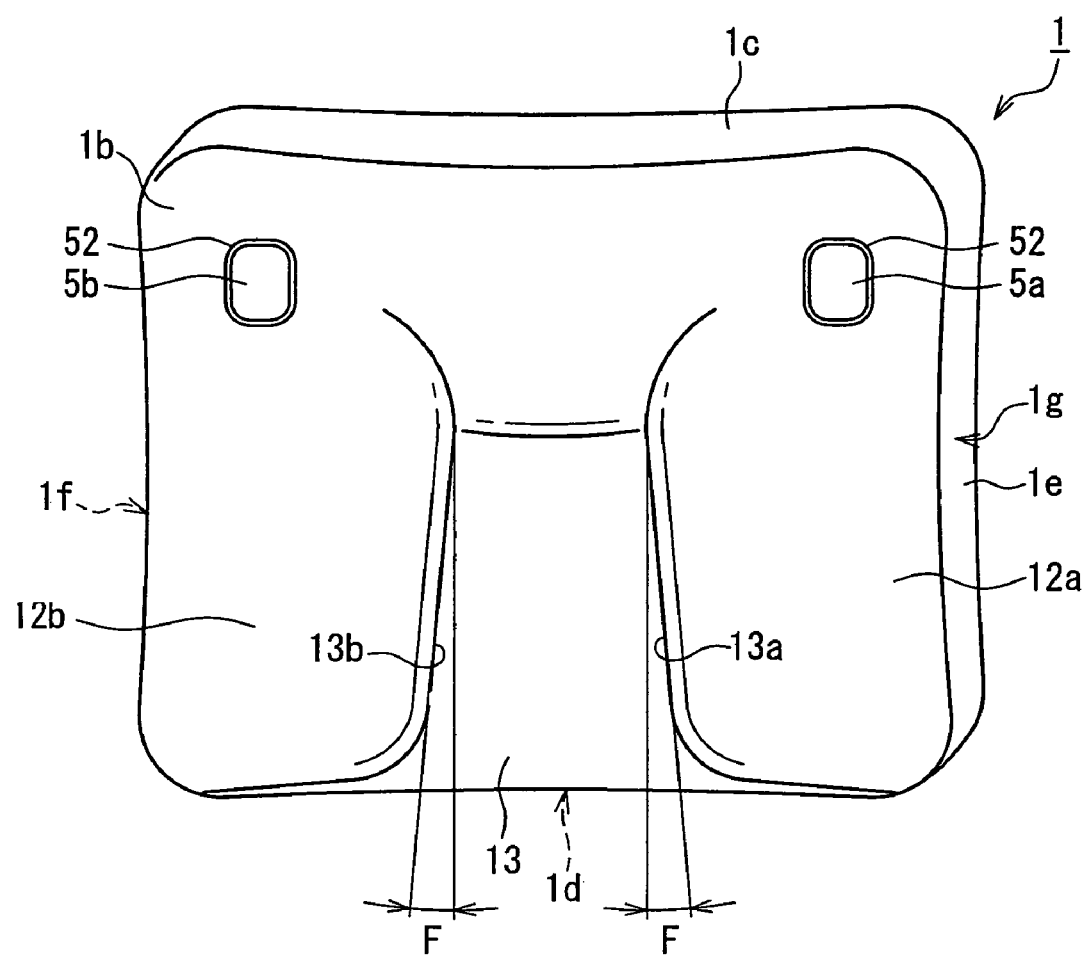
FIG. 2 is a perspective view of the external appearance of an electronic device according to Embodiment 1.

FIGS. 1 and 2 are perspective views of the external appearance of an electronic device according to the present embodiment. FIG. 1 mainly shows the configuration of a front side. FIG. 2 mainly shows the configuration of a back side. An electronic device 1 of the present embodiment is an example of a PDA in which a processing unit such as a central processing unit and a storage unit, such as a semiconductor memory capable of storing information, are provided. The electronic device 1 includes a liquid crystal monitor 2 (display unit), operation buttons 3 (main operating unit), auxiliary operation buttons 4a to 4e (main operating unit) and back operation buttons 5a and 5b (sub-operating unit).

The outer cover of the electronic device 1 is formed with a casing that may be constituted of six sides composed of flat or curved surfaces. In the present embodiment, a front face 1a is disposed on the liquid crystal monitor 2 and operation buttons 3. A back face 1b is back side of the front face 1a. A top face 1c is a side that adjoins the front face 1a and the back face 1b, and is an upper side in FIGS. 1 and 2. A bottom face 1d is a side opposite the top face 1c. A left lateral face 1e is a side that adjoins the front face 1a, the back face 1b, the top face 1c and the bottom face 1d, and is a left side in FIG. 1. A right lateral face 1f is a side opposite the left lateral face 1e. In the present embodiment, the electronic device 1 is small and light enough to be held easily by a user with one or both hands. Further, the left lateral face 1e and right lateral face 1f are formed so that their substantially central portions in the longitudinal direction are bowed inward toward an interior of the electronic device 1. The casing is formed in a box shape by connecting a front casing to a back casing (not shown).

A display control microcomputer contained in the processing unit in the electronic device 1 can display various types of information on the liquid crystal monitor 2. In the present embodiment, the size of the available display area of the liquid crystal monitor 2 is approximately seven inches. Although a display panel having a touch panel function with which prescribed operations can be performed by pressing a display surface is used as the liquid crystal monitor 2 in the present embodiment, a display panel that only performs a display function may also be used. Although the liquid crystal monitor 2 is mounted as a display unit in the present embodiment, the present invention is not limited to a liquid crystal monitor as long as a display unit is used that can at least display information, such as an organic EL display (EL: electronic luminescence).

The operation buttons 3 are constituted from a plurality of buttons with which the alphabet and the Japanese language, and the like, which are generally used on, e.g., a keyboard of a personal computer, can be input. Although only push-button-type operation buttons are disposed in the present embodiment, the present invention may include a lever-type operating unit, a ball-type operating unit and the like.

The auxiliary operation buttons 4a and 4b are disposed on a side closer to the left lateral face 1e with respect to the liquid crystal monitor 2. Further, an area A1 (one example of a flat portion of the present invention) on which at least a first digit of a user can be positioned is provided between the auxiliary operation buttons 4a and 4b. Various types of operation buttons are not disposed on the area A1. The auxiliary operation buttons 4c to 4e are disposed on a side closer to the right lateral face 1f with respect to the liquid crystal monitor 2. Further, an area A2 (one example of a flat portion of the present invention) on which at least a first digit of a user can be positioned is provided between the auxiliary operation buttons 4d and 4e. Various types of operation buttons are not disposed on the area A2. Thus, by not disposing various types of operation buttons in the areas A1 and A2, erroneous operation caused by a first digit accidentally touching various types of the operation buttons can be prevented when the user holds the electronic device 1 with one or both hands. When first digits are not operating the operation buttons 3 or either the left or right auxiliary operation buttons 4 (4a to 4e), what is known as a home position in which a non-operating first digit is positioned on the area A1 or A2 can be taken, enabling a user to hold the electronic device 1 reliably.

In addition, light emitting diodes capable of displaying information on the electronic device 1, such as a power-on state, a remaining battery level and a state of access to a storage unit, can be disposed near the area A1 or A2. By disposing the light emitting diodes on a portion other than the areas A1 and A2, the state of luminescence of the light emitting diodes easily can be viewed because a first digit does not cover the light emitting diodes when a user holds the electronic device 1 with one or both hands.

The back operation buttons 5a and 5b are disposed respectively on portions close to the left and right ends of the back face 1b. Different functions may be respectively assigned to the back operation buttons 5a and 5b or the same function may be assigned. In the present embodiment, the same function is assigned respectively to the back operation buttons 5a and 5b.

A processing unit, such as a central processing unit, and a storage unit, such as a semiconductor memory capable of storing various types of information, are provided in the electronic device 1, and the processing unit can perform prescribed information processing when the operating unit, such as the operation buttons 3, is operated by a user. Further, in the electronic device 1, the results of processing in the processing unit can be displayed on a display unit, such as the liquid crystal monitor 2.

2. Configuration of Peripheral Projection

On the electronic device 1 of the present embodiment, a peripheral projection 11 is formed along a peripheral edge portion of the front face 1a as shown in FIG. 1. The peripheral projection 11 includes a first projection 11w, a second projection 11x, a third projection 11y, and a fourth projection 11z. The first projection 11w, second projection 11x, third projection 11y, and fourth projection 11z are connected to each other. The first projection 11w is a portion formed along the peripheral edge portion of the front face 1a that adjoins the top face 1c. The second projection 11x is a portion formed along the peripheral edge portion of the front face 1a that adjoins the bottom face 1d. The third projection 11y is a portion formed along the peripheral edge portion of the front face 1a that adjoins the left lateral face 1e. The fourth projection 11z is a portion formed along the peripheral edge portion of the front face 1a that adjoins the right lateral face 1f.

Figure 3:
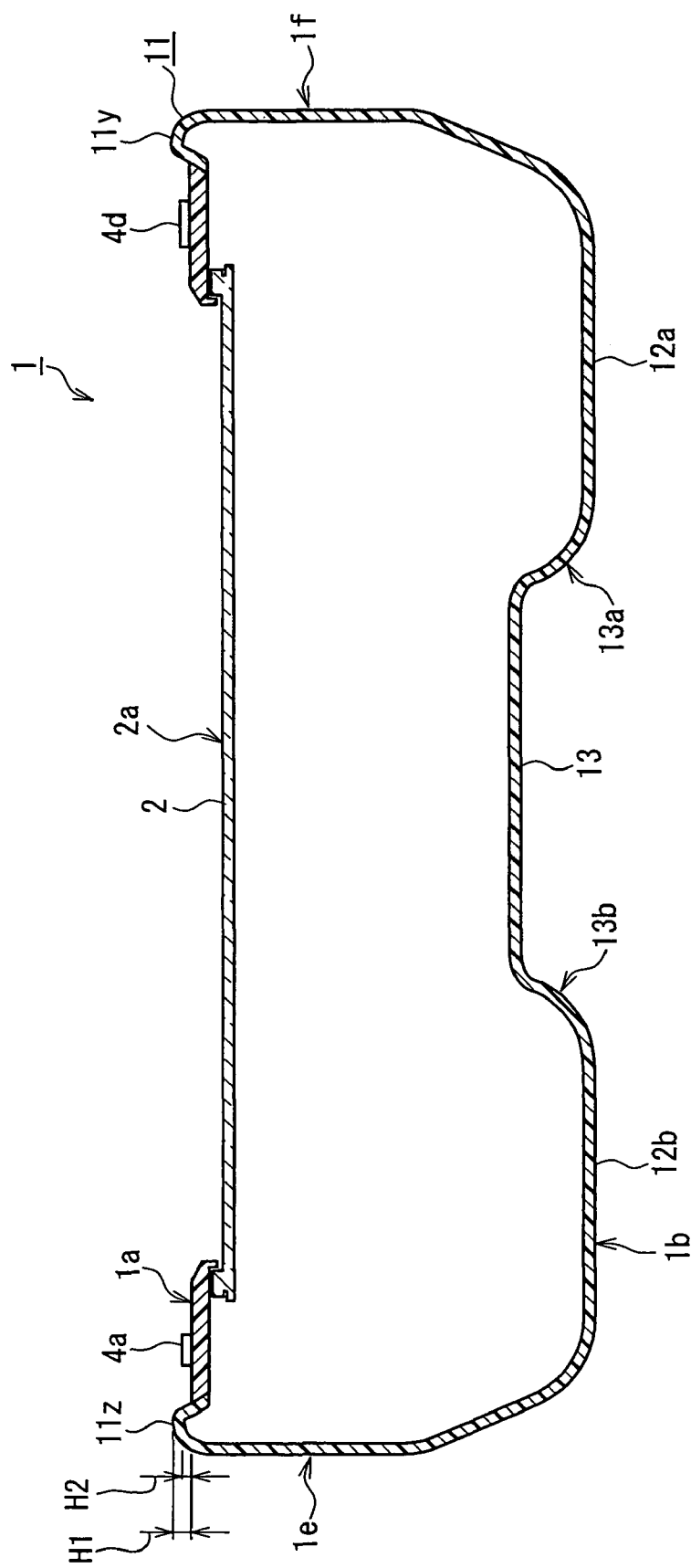
FIG. 3 is a cross-sectional view of a Z-Z portion in FIG. 1.

FIG. 3 is a cross-sectional view of the electronic device 1 and shows a cross section of a Z-Z portion in FIG. 1. A height H1 of the peripheral projection 11 is formed so as to be greater than a height H2 of the entire operating portion disposed at least on the front face 1a (only auxiliary operation buttons 4a and 4d are shown in FIG. 3) in a non-operational state. Consequently, when the electronic device 1 is placed on a desk or the like, even if it is placed in a manner such that the front face 1a faces a flat surface of the desk, the top of the peripheral projection 11 comes into contact with the flat surface, and the top of the operating portion disposed on the front face 1a does not come into contact with the flat surface. Thus, erroneous operation of the operating portion disposed on the front face 1a caused by the self-weight of the electronic device 1 is prevented.

Note that, "the top of the peripheral projection 11" refers to the highest portion of the peripheral projection 11 in the direction perpendicular to the front face 1a of the casing with respect to the front face 1a. Note that, "the top of the operating portion" refers to the highest portion of the operation buttons 3 and auxiliary operation buttons 4a to 4e in the direction perpendicular to the front face 1a of the casing with respect to the front face 1a.

Moreover, the peripheral projection 11 is formed so as to have a greater height than a surface 2a of the liquid crystal monitor 2. Accordingly, even if the electronic device 1 is placed in a manner such that the front face 1a faces a flat surface of a desk, the surface 2a of the liquid crystal monitor 2 does not come into contact with the flat surface while the peripheral projection 11 comes into contact with the flat surface. Consequently, scratching of the surface 2a of the liquid crystal monitor 2 or damage to the liquid crystal monitor 2, caused by pressure due to the self-weight of the electronic device 1, can be prevented.

Although the peripheral projection 11 can be formed with a resin or a metal, it is preferable to form the peripheral projection 11 using an elastic material such as rubber. By forming the peripheral projection 11 using an elastic material, even if the electronic device 1 is dropped on a floor or the like with the front face 1a facing vertically downward, the peripheral projection 11 can reduce damage to the electronic device 1 because the peripheral projection 11 can absorb the shock when the device is dropped. In addition, by forming the peripheral projection 11 using an elastic material, when a user holds the device, elastic deformation occurs slightly in accordance with the shape of the user's hand, and grip-ability improves. Further, by forming the peripheral projection 11 using an elastic material, in comparison with the case in which the peripheral projection 11 is formed using a hard material such as metal, the peripheral projection 11 can reduce the fatigue that a user feels when holding the device for a long time by dispersing the pressure on the user's hand. Note that, for example, a resin material having elastomeric properties can be used as a material for the peripheral projection 11.

Note that, in the present embodiment, the height of the peripheral projection 11 is determined so that the top of the operating portion does not come into contact with a flat surface when the electronic device 1 is placed in a manner such that the front face 1a faces such a flat surface. However, even if the height allows the top of the operating portion to come into contact with the flat surface or the operating portion to be pressed slightly, the height of the peripheral projection 11 may be determined so that a switch element disposed inside or under the operating portion can be prevented from operating.

Figure 4:
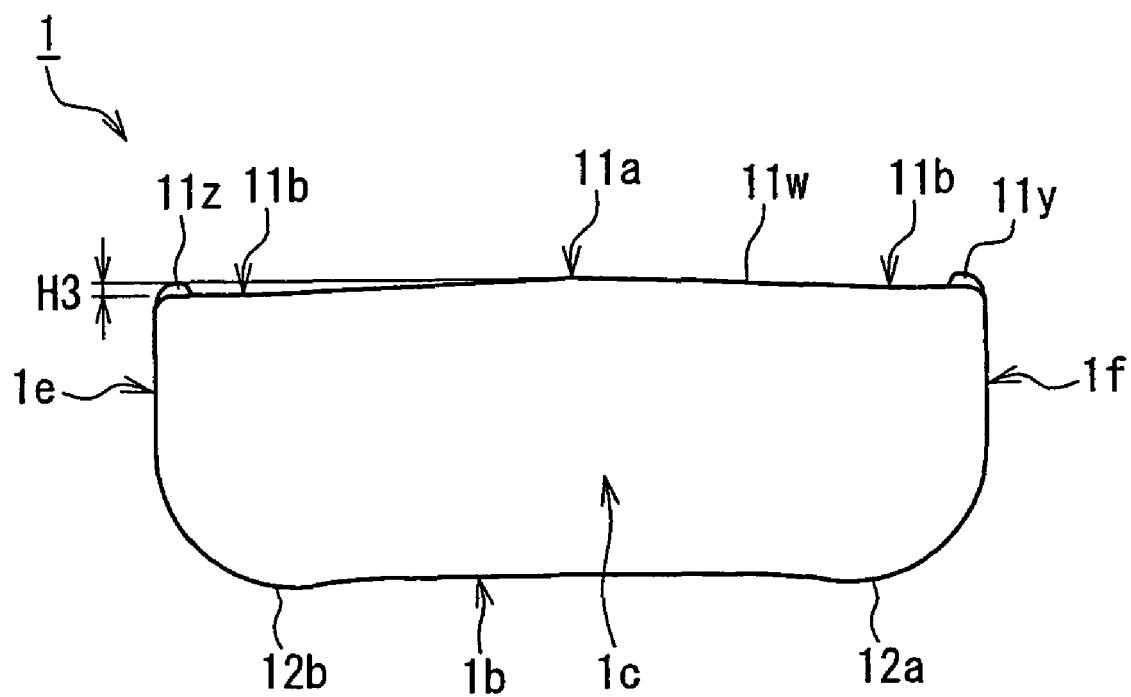
FIG. 4 is a side view of an electronic device viewed from the direction indicated by an arrow X in FIG. 1.

Also, the entire peripheral projection 11 may be formed so as to be the same in height, but part of the peripheral projection 11 may be different in height. FIG. 4 is a side view of the electronic device 1 viewed from the direction indicated by an arrow U in FIG. 1. As shown in FIG. 4, for the first projection 11w of the peripheral projection 11, a central portion 11a in the longitudinal direction can be formed to have a difference in height (height H3) with respect to an end portion 11b in a longitudinal direction. With this configuration, even when the electronic device 1 is placed on a desk in a manner such that the front face 1a faces a flat surface of the desk, erroneous operation of the operation buttons disposed on the front face 1a can be prevented, because the top of the peripheral projection 11 comes into contact with the flat surface, while the top of the operating portion disposed on the front face 1a does not come into contact with the flat surface. Even when the electronic device 1 is placed on a desk in a manner such that the front face 1a faces a flat surface of the desk, damage to the liquid crystal monitor 2 can also be prevented, because the top of the peripheral projection 11 comes into contact with the flat surface, while the liquid crystal monitor 2 does not come into contact with the flat surface.

Note that, the central portion 11a is formed to have the same height as that of other portions of the peripheral projection 11 (second projection 11x, third projection 11y, and fourth projection 11z), and the end portion 11b is formed to have a lower height than the central portion 11a and other portions of the peripheral projection 11.

Further, configuration is not limited to one embodiment in which the central portion 11a and end portion 11b of the first projection 11w are formed so as to have different heights as shown in FIG. 4. A central portion and an end portion of the third projection 11y may be formed so as to have different heights. A central portion and an end portion of the fourth projection 11z may be formed so as to have different heights.

Although the peripheral projection 11 may be formed along the entire peripheral edge portion of the front face 1a, the peripheral projection 11 functions similarly if it is formed along at least three sides of the peripheral edge portion of the front face 1a. For example, by forming only the first projection 11w, the third projection 11y and the fourth projection 11z, even if the electronic device 1 is placed in a manner such that the front face 1a faces a flat surface, erroneous operation of the operating portion disposed on the front face 1a and damage to the liquid crystal monitor 2 can be prevented.

In the present embodiment, the first projection 11w, the third projection 11y, and the fourth projection 11z are formed so as to have the same height, and the second projection 11x is formed so as to have a lower height than the first projection 11w and the like.

Figure 5:
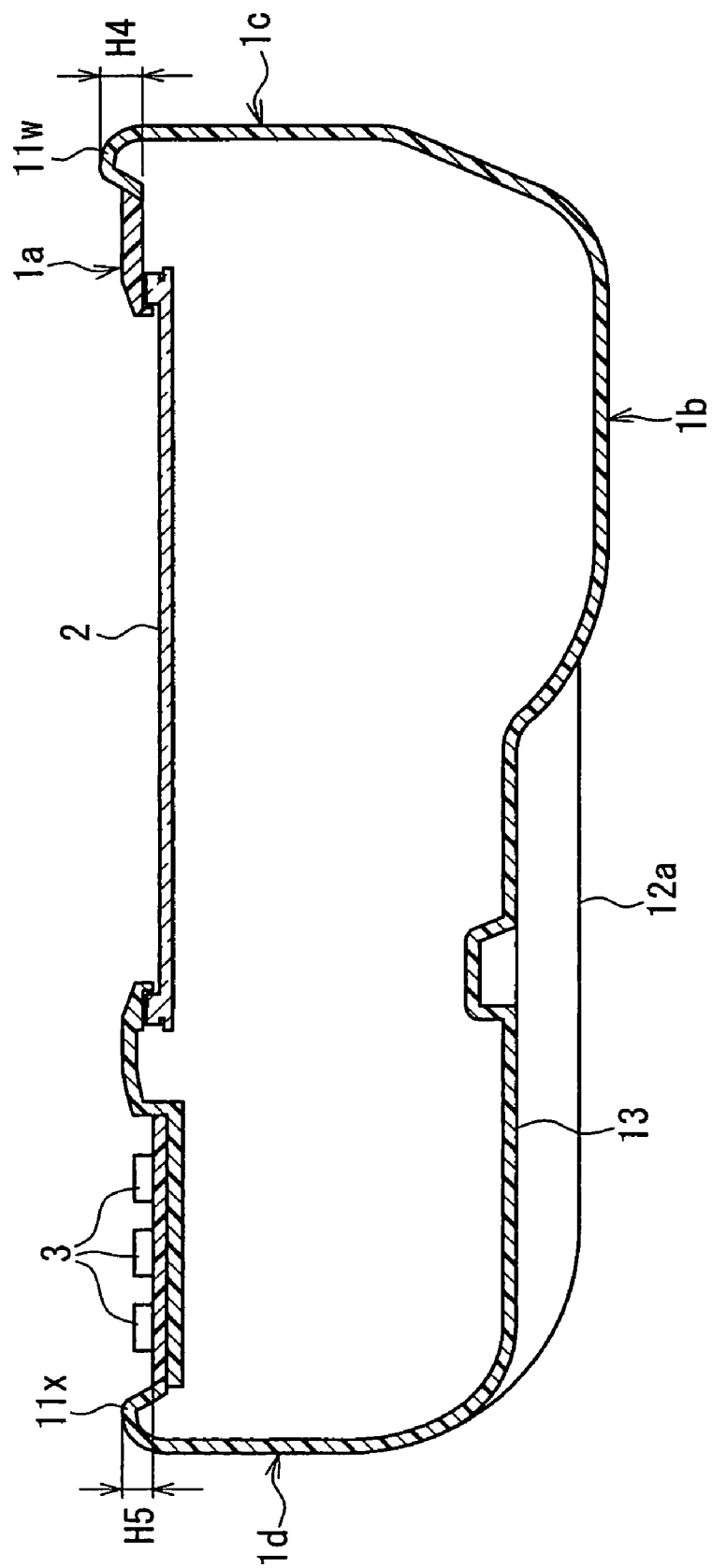
FIG. 5 is a cross-sectional view of a Y-Y portion in FIG. 1.

FIG. 5 is a cross-sectional view of a Y-Y portion in FIG. 1. As shown in FIG. 5, the height H5 of the second projection 11x (height from the surface of the liquid crystal monitor 2 to the top of the second projection 11x) is lower than the height H4 of the first projection 11w (height from the surface of the liquid crystal monitor 2 to the top of the first projection 11w). With this configuration, erroneous operation of the operation buttons disposed on the front face 1a and damage to the liquid crystal monitor 2 can be prevented.

3. Method for Holding Electronic Device

The electronic device 1 can be operated in a state in which it is placed on a desk or the like, and also in a state where it is held with one or both hands.

Figure 6:
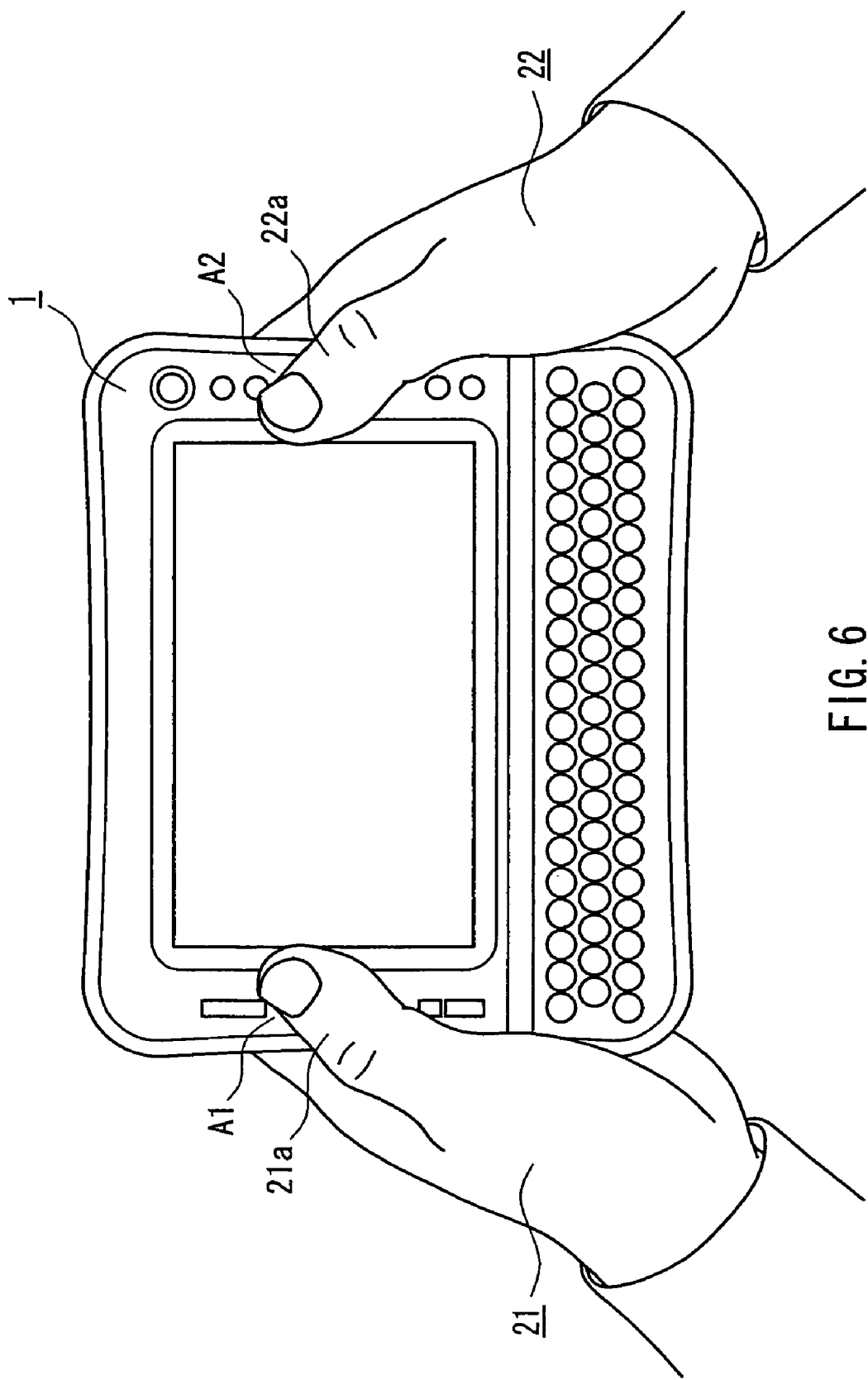
FIG. 6 is a plan view showing a state in which a user is holding an electronic device according to Embodiment 1.
Figure 7:
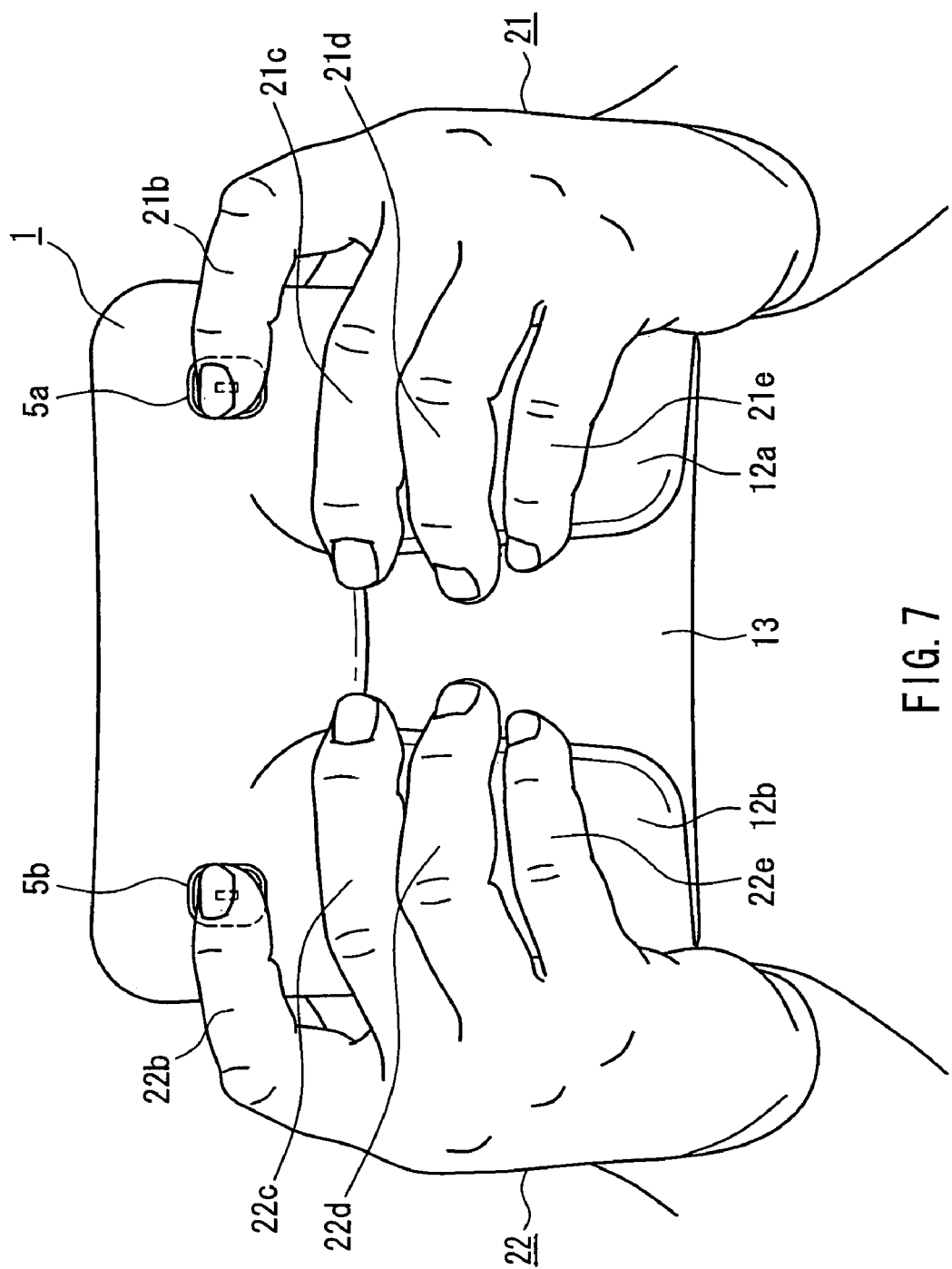
FIG. 7 is a plan view showing a state in which a user is holding an electronic device according to Embodiment 1.
Figure 8:
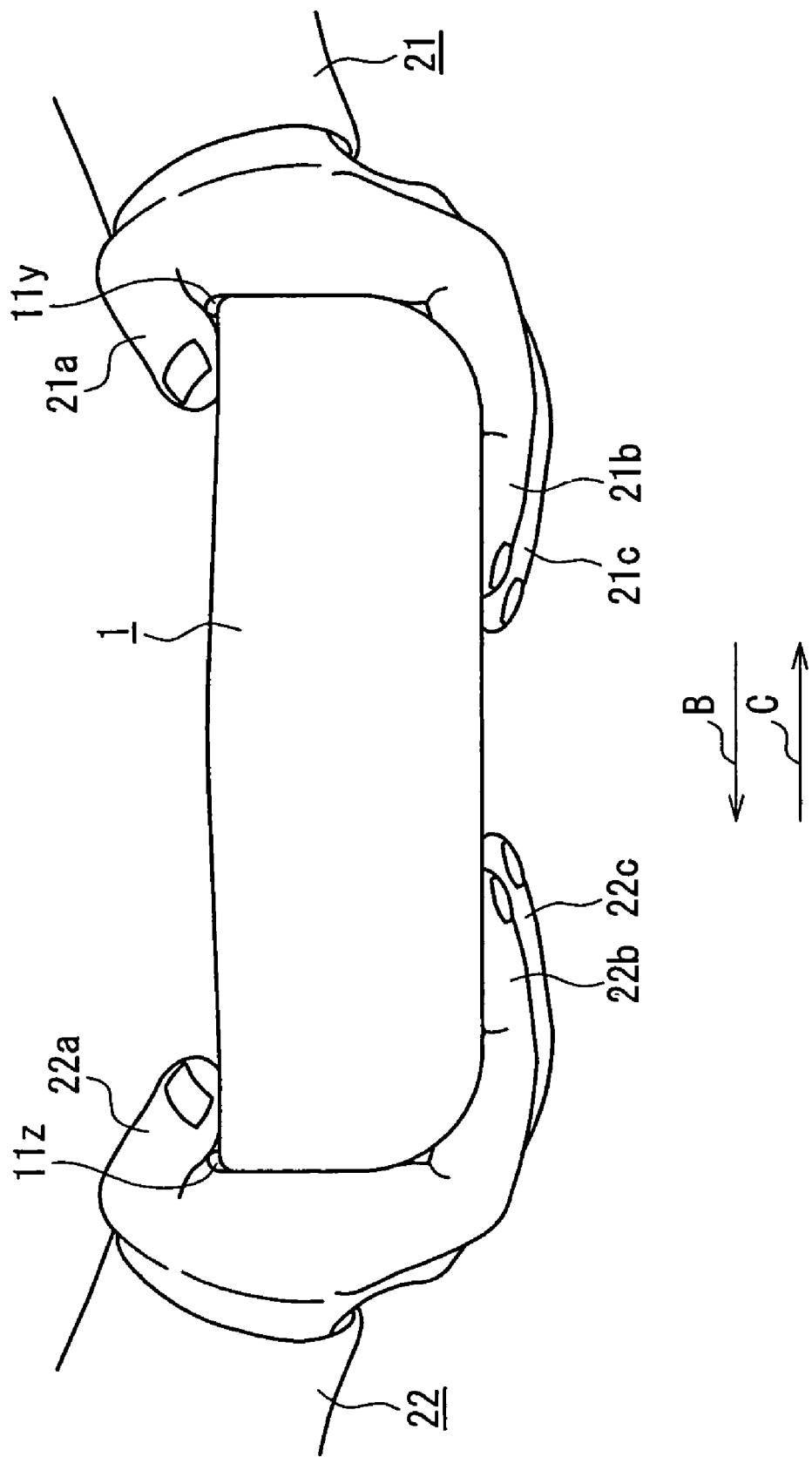
FIG. 8 is a side view showing a state in which a user is holding an electronic device according to Embodiment 1.

FIG. 6 shows a state in which the electronic device 1 is held with both hands viewed from the front side. FIG. 7 shows a state in which the electronic device 1 is held with both hands viewed from the back side. FIG. 8 shows a state in which the electronic device 1 is held with both hands viewed from the top face 1c side (direction indicated by the arrow U in FIG. 1).

As shown in FIG. 2, the back face 1b includes holding portions 12a and 12b in positions close to the left lateral face 1e and the right lateral face 1f, respectively.

As shown in FIG. 4, the holding portions 12a and 12b are preferably formed as curved surfaces. This improves grip-ability because the holding portions 12a and 12b conform better to the fingers of a left hand 21 and a right hand 22, respectively. Note that, the holding portions 12a and 12b can also be formed as flat surfaces. As shown in FIG. 4, a boundary portion between the holding portion 12a and the left lateral face 1e and a boundary portion between the holding portion 12b and the right lateral face 1f are also preferably formed as curved surfaces. This improves grip-ability because the boundary portions conform better to portions close to the bases of the fingers and the palms of the left hand 21 and the right hand 22.

As shown in FIG. 3, a depressed portion 13 is formed between the holding portions 12a and 12b in a depressed shape in the direction perpendicular to the back face 1b. As shown in FIG. 3, the depressed portion 13 includes an inner surface 13a adjoining the holding portion 12a and an inner surface 13b adjoining the holding portion 12b. A boundary portion between the inner surface 13a and the holding portion 12a and a boundary portion between the inner surface 13b and holding portion 12b preferably are formed as curved surfaces. This improves grip-ability because the boundary portions conform better to portions close to the ends of the fingers of the left hand 21 and the right hand 22. As shown in FIG. 2, the inner surfaces 13a and 13b are formed so as to be inclined by an angle of F degrees with respect to a line segment parallel to the short side of the liquid crystal monitor 2.

When the electronic device 1 is held with one hand, for example, the left hand 21, the palm of the left hand is in contact with a bowed portion 1g of the left lateral face 1e of the electronic device 1; a second digit 21b (index finger), third digit 21c (middle finger), fourth digit 21d (ring finger) and fifth digit 21e (little finger) are positioned on the holding portion 12a on the back face 1b of the electronic device 1; and a first digit 21a (thumb) is positioned on the front face 1a.

In addition, on the back face 1b of the electronic device 1, the ends of the second digit 21b to the fifth digit 21e (distal ends) are in contact with the inner surface 13a of the depressed portion 13 when the electronic device 1 is held with the left hand 21. Thus, the electronic device 1 is restricted from shifting in a direction that would allow it to leave the hand, so the possibility of accidentally dropping the electronic device 1 can be reduced.

When the electronic device 1 is held with the left hand 21, the auxiliary operation button 4a and the like can be operated with the first digit 21a of the left hand 21, and the operation buttons 3, a touch-panel-type liquid crystal monitor 2 and the like can be operated with the right hand 22, because the right hand 22 is not holding any portions of the electronic device 1.

When the electronic device 1 is held with the right hand 22; a second digit 22b, a third digit 22c, a fourth digit 22d, and a fifth digit 22e of the right hand 22 are positioned on the holding portion 12b on the back face 1b of the electronic device 1; and a first digit 22a is positioned on the front face 1a. When the electronic device 1 is held with the right hand 22, the auxiliary operation button 4c and the like can be operated with the first digit 22a of the right hand 22, and the operation buttons 3, a touch-panel-type liquid crystal monitor 2 and the like can be operated with the left hand 21, because the left hand 21 is not holding any portions of the electronic device 1.

When the electronic device 1 is held with both hands as shown in FIGS. 6 to 8, it is held in a state in which the palm of the left hand 21 is in contact with the bowed portion 1g of the left lateral face 1e of the electronic device 1; the second digit 21b, third digit 21c, fourth digit 21d, and fifth digit 21e are positioned on the holding portion 12a on the back face 1b of the electronic device 1; and the first digit 21a is positioned on the front face 1a. At this time, a portion near the end of the first digit 21a preferably is positioned on the area A1, so that the erroneous operation of various types of operation buttons can be prevented. The electronic device 1 also is held in a state in which the palm of the right hand 22 is in contact with a bowed portion 1h of the right lateral face 1f of the electronic device 1; the second digit 22b, third digit 22c, fourth digit 22d, and fifth digit 22e are positioned on the holding portion 12b on the back face 1b of the electronic device 1; and the first digit 22a is positioned on the front face 1a. At this time, a portion near the end of the first digit 22a preferably is positioned on the area A2, so that the erroneous operation of various types of operation buttons can be prevented.

When the electronic device 1 is held with both hands, by shifting the first digit 21a of the left hand 21 in the surface direction of the front face 1a, the operation buttons disposed on a side near the left lateral face 1e from among the operation buttons 3 and the auxiliary operation buttons 4a and 4b can be operated. Further, by shifting the first digit 22a of the right hand 22 in the surface direction of the front face 1a, the operation buttons disposed on a side near the right lateral face 1f from among the operation buttons 3 and the auxiliary operation buttons 4c to 4e can be operated.

Moreover, when the electronic device 1 is held with both hands, the back operation button 5a can be operated with the second digit 21b of the left hand 21, and the back operation button 5b can be operated with the second digit 22b of the right hand 22.

In the present embodiment, by forming the peripheral projection 11 along the peripheral edge portion of the front face 1a, when the electronic device 1 is handheld, the part of the first digit of the left hand 21 between the distal end of the palm side and a portion near the first knuckle (finger segment between the first knuckle and the end of the finger) becomes capable of contacting the third projection 11y as shown in FIG. 8. Also, part of the first digit of the right hand 22 between the distal end of the palm side and a portion near the first knuckle (finger segment between the first knuckle and the end of the finger) becomes capable of contacting the fourth projection 11z. Accordingly, for example, when the electronic device 1 is held with the left hand 21, the first digit 21a fits around the third projection 11y, and the electronic device 1 is restricted from shifting in the direction indicated by an arrow B (see FIG. 8) with respect to the left hand 21. Also, when the electronic device 1 is held with the right hand 22, the first digit 22a fits around the fourth projection 11z, and the electronic device 1 is restricted from shifting in the direction indicated by an arrow C (see FIG. 8) with respect to the right hand 22.

Thus, when the electronic device 1 is held with one hand, the possibility of accidentally dropping the electronic device 1 can be reduced, because the electronic device 1 is restricted from shifting in a direction that would allow it to leave the hand.

In addition to this, the ends of the second digit to the fifth digit (distal ends) come into contact with the inner surface 13a or 13b of the depressed portion 13 on the back face 1b of the electronic device 1. Then, when the electronic device 1 is held with one hand, the electronic device 1 is restricted from shifting in a direction that would allow it to leave the hand (direction indicated by the arrow B or C in FIG. 8), and the possibility of accidentally dropping the electronic device 1 can be reduced. That is, by forming the peripheral projection 11, holding portions 12a and 12b and depressed portion 13, the electronic device 1 can be reliably held.

As shown in FIG. 2, the inner surfaces 13a and 13b are formed so as to be inclined by an angle of F degrees with respect to a line segment parallel to the short side of the liquid crystal monitor 2. As a result of this, when the electronic device 1 is handheld, the ends of the second digits 21b and 22b, third digits 21c and 22c, fourth digits 21d and 22d, and fifth digits 21e and 22e can come into contact with the inner surfaces 13a and 13b, with the left hand 21 and right hand 22 in a comfortable position, as shown in FIG. 7. For example, if the distance between the left lateral face 1e and inner surface 13a and the distance between the right lateral face 1f and the inner surface 13b are the same along the entire inner surfaces 13a and 13b, it would be difficult for the fifth digits 21e and 22e, which are shorter than the second digits 21b and 22b, third digits 21c and 22c, and fourth digits 21d and 22d; to reach the inner surfaces 13a and 13b. Thus, the electronic device 1 would be held with the left hand 21 and right hand 22 in an uncomfortable position. As in the present embodiment, by inclining the inner surfaces 13a and 13b, the fifth digits 21e and 22e can reliably come into contact with the inner surfaces 13a and 13b, and the electronic device 1 can be held in a comfortable position.

Figure 9:
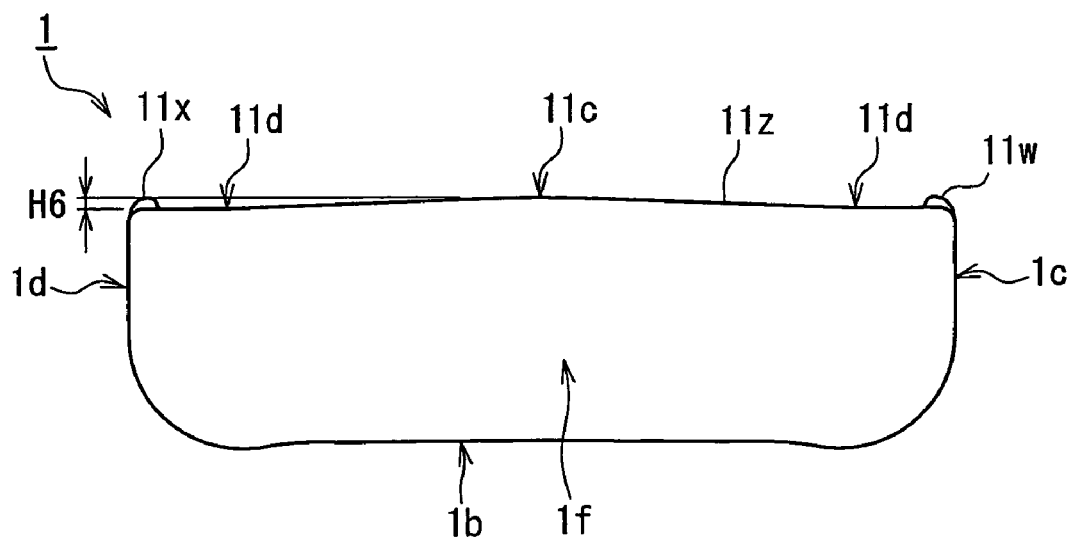
FIG. 9 is a side view of an electronic device viewed from the direction indicated by an arrow U in FIG. 1.

FIG. 9 is a side view of the electronic device 1 viewed from the direction indicated by an arrow X in FIG. 1. As shown in FIG. 9, on the fourth projection 11z (or the third projection 11y), a central portion 11c in the longitudinal direction can be formed so as to have a difference in height (height H6) relative to an end portion 11d in the longitudinal direction. The height of the central portion 11c is the same as that to the top of the first projection 11w and second projection 11x. The end portion 11d is formed so as to be lower than the central portion 11c and the top of the first projection 11w and second projection 11x by the height H6. By forming them as described above, when the electronic device 1 is handheld as shown in FIGS. 6 to 8, part of the first digit between the distal end and the first knuckle comes into contact with the central portion 11c. Thus, the electronic device 1 is restricted from shifting in a direction that would allow it to leave the hand, and the possibility of accidentally dropping the electronic device 1 can be reduced.

When the electronic device 1 is handheld, the first knuckle of the first digit is positioned on the front face 1a, a second knuckle is positioned nearly on the central portion 11c, and a thenar is positioned on the end portion 11d. That is, by making the peripheral projection 11 uneven (central portion 11c and end portion 11d) in accordance with the unevenness of the first digit and the thenar of the hand, the first digit can be positioned comfortably on the electronic device 1, and gripability can be improved.

Figure 10:
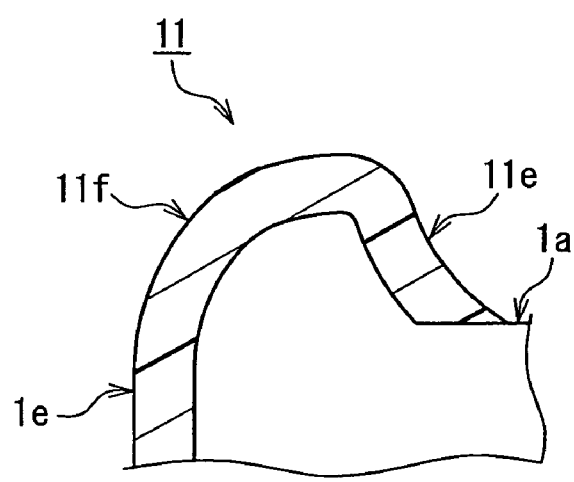
FIG. 10 is a cross-sectional view of a W-W portion in FIG. 1.

FIG. 10 is a cross-sectional view of the relevant parts of the peripheral projection 11 and shows a cross section of a W-W portion in FIG. 1. Although, even if the cross-sectional shape of the peripheral projection 11 forms a circular arc with a radius of constant curvature, it is still effective in improving grip-ability when holding the device and/or preventing erroneous operation of the operation buttons. However, if the cross-sectional shape is formed as shown in FIG. 10, its effectiveness will be increased.

The peripheral projection 11 shown in FIG. 10 includes a face 11e adjoining the front face 1a that forms a concave circular arc and a face 11f adjoining the left lateral face 1e that forms a convex circular arc. With this configuration, when the electronic device 1 is handheld, a portion near the end of the first digit (part of the first digit between the distal end and first knuckle) comes into contact with the face 11e, and the thenar comes into contact with the face 11f. Accordingly, the face 11e conforms to the portion near the end of the first digit, and grip-ability can be improved.

Moreover, by making the face 11f with which the thenar comes into contact a convex circular arc, pressure on the thenar can be dispersed, and the fatigue caused by using the device for a long time can be reduced.

Note that, the curvature radii of the surfaces 11e and 11f may be the same or different.

4. Effects of Embodiment, etc

According to the present embodiment, on the peripheral edge portion of the front face 1a of the electronic device 1, by forming the peripheral projection 11 higher than at least the various types of operation buttons disposed on the front face 1a, even when the electronic device 1 is placed on a desk or the like in a manner such that the front face 1a faces a flat surface of the desk, the operation buttons will not be pressed or operated by the self-weight of the electronic device 1, and erroneous operation can be prevented.

For example, in the case in which the electronic device 1 includes a power supply battery internally, and an opening/closing cover for exchanging the power supply battery is disposed on the back face 1b, the electronic device 1 may be placed in a manner such that the front face 1a faces a desk or the like when the opening/closing cover is opened/closed. At this time, the peripheral projection 11 comes into contact with the desk or the like. Thus, the operation buttons will not be pressed or operated by the self-weight of the electronic device 1, and erroneous operation of the operation buttons can be prevented. In particular, if a power button is operated accidentally by the self-weight of the electronic device 1 just before the power supply battery is removed from the electronic device 1, the power of the electronic device 1 will be turned on, and the start-up process of the electronic device 1 will begin. Then, if a user, who is not aware that the start-up process has been operated, opens the opening/closing cover in order to remove the power supply battery from the electronic device 1, a system of the electronic device 1 may be damaged. In the present embodiment, such a problem is not likely to occur because the possibility that erroneous operation of the power button occurs when the power supply battery is removed is low.

Further, on the peripheral edge portion of the front face 1a of the electronic device 1, by forming the peripheral projection 11 higher than at least the various types of operation buttons disposed on the front face 1a, even when the electronic device 1 is placed on a desk or the like in a manner such that the front face 1a faces a flat surface of the desk, a space can be formed between the liquid crystal monitor 2 and the desk, and scratching of the surface 2a of the liquid crystal monitor 2, or the like, can be prevented.

Moreover, by forming the peripheral projection 11 on a portion on which the first digit is positioned when the electronic device 1 is handheld, the first digit can fit around the peripheral projection 11 when holding the electronic device 1, and the possibility of accidentally dropping the electronic device 1 can be reduced.

In addition, by providing the bowed portions 1g and 1h that are formed bowed inward toward the interior of the electronic device 1 to the left lateral face 1e and right lateral face 1f, respectively, the bowed portions 1g and 1h conform to the user's palms when the electronic device 1 is handheld, and grip-ability can be improved.

Further, by providing portions that are formed bowed inward toward the interior of the electronic device 1 to the left lateral face 1e and right lateral face 1f, the electronic device 1 can be restricted from shifting in the directions indicated by arrows D and E (see FIG. 1) when the device is held, and the possibility that the electronic device 1 could slip out of the hands and accidentally be dropped can be reduced.

Note that, although a PDA is exemplified and described in the present embodiment, the present invention can also be applied to any device that a user can hold and operate. The present invention is useful for personal computers; drives in which a disk medium such as a DVD and the like can be mounted; portable disk players including a hard disk drive and the like; portable navigation systems; medical terminals in which nurses and the like collect inspection data to check the daily condition of a patient; and the like, for example.

The liquid crystal monitor 2 in the present embodiment is an example of a display unit of the present invention. The operation buttons 3 and auxiliary operation buttons 4a to 4e are also examples of main operating units. The back operation buttons 5a and 5b are also examples of sub-operating units. The front face 1a of the casing is also an example of a front main face of the present invention. The back face 1b of the casing is also an example of a back main face of the present invention. The peripheral projection 11 is also an example of a peripheral projection of the present invention. The bowed portions 1g and 1h are also examples of bowed portions of the present invention. The depressed portion 13 is also an example of a recessed surface portion of the present invention. The areas A1 and A2 are also examples of flat portions of the present invention.

EMBODIMENT 2

1. Configuration of Electronic Device

Figure 11:
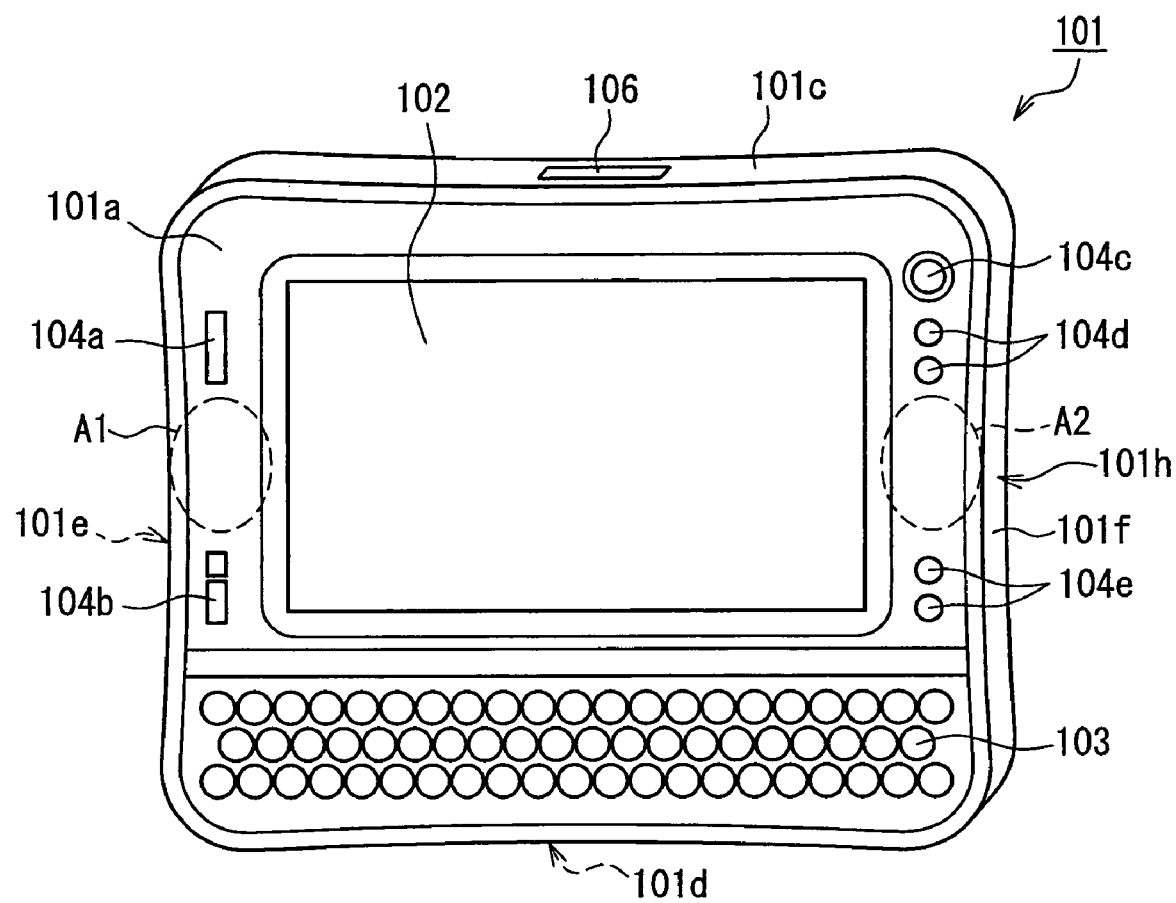
FIG. 11 is a perspective view of the external appearance of an electronic device according to Embodiment 2.
Figure 12:
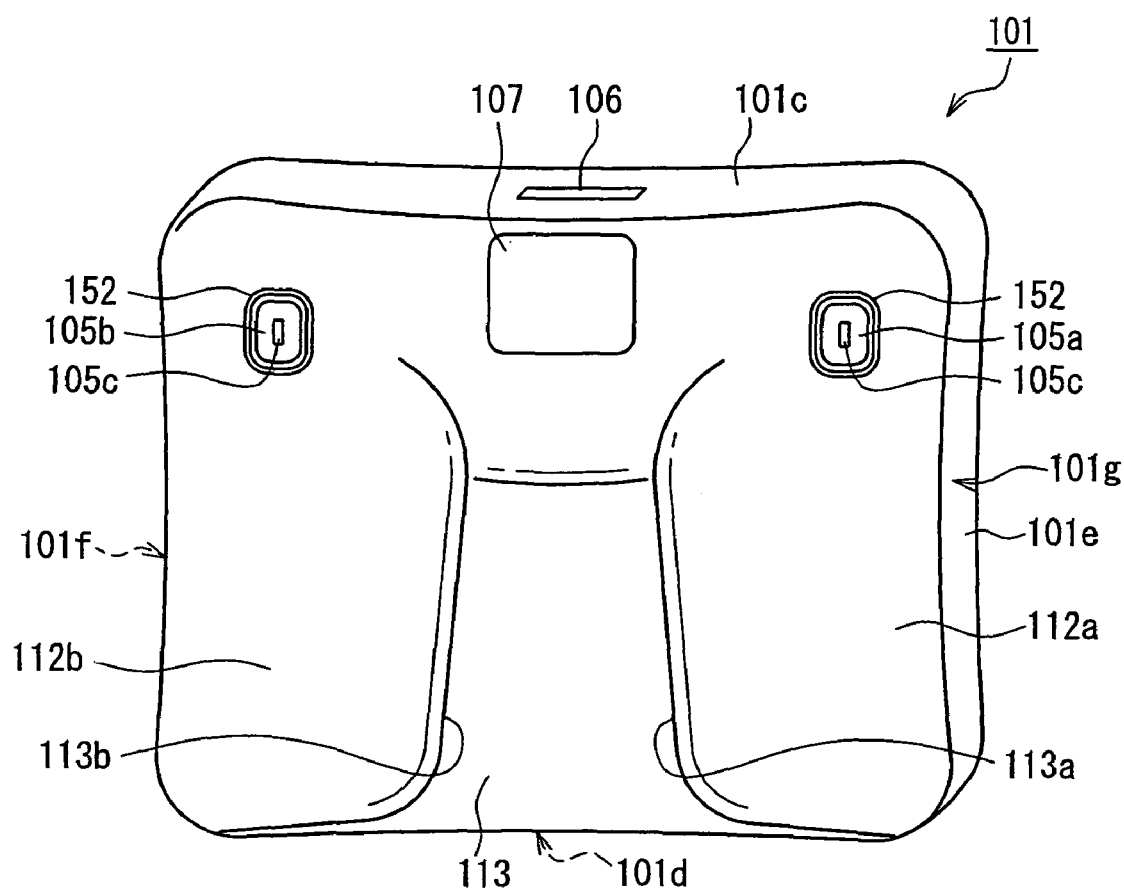
FIG. 12 is a perspective view of the external appearance of an electronic device according to Embodiment 2.

FIGS. 11 and 12 are perspective views of the external appearance of an electronic device in the present embodiment. FIG. 11 mainly shows a configuration of a front side. FIG. 12 mainly shows a configuration of a back side. An electronic device 101 of the present embodiment is an example of a PDA in which a processing unit, such as a central processing unit, and a storage unit, such as a semiconductor memory capable of storing information, are provided. In addition, the electronic device 101 includes a liquid crystal monitor 102 (display unit), operation buttons 103 (main operating unit), auxiliary operation buttons 104a to 104e (main operating unit) and back operation buttons 105a and 105b (sub-operating unit).

The outer cover of the electronic device 101 is formed with a casing constituted of six sides composed of flat or curved surfaces. In the present embodiment, a side on which the liquid crystal monitor 102 and operation buttons 103 are disposed is defined as a front face 101a; a back side of the front face 101a is defined as a back face 101b; a side adjoining the front face 101a and back face 101b, and is an upper side in FIGS. 11 and 12 is defined as a top face 101c; a side opposite the top face 101c is defined as a bottom face 101d; a side that adjoins the front face 101a, back face 101b, top face 101c, and bottom face 101d, and is a left side in FIG. 11 is defined as a left lateral face 101e; and a side opposite the left lateral face 101e is defined as a right lateral face 101f. Also, in the present embodiment, the electronic device 101 is small and light enough to be held easily by a user with one or both hands. Further, the left lateral face 101e and right lateral face 101f are formed so that their substantially central portions in the longitudinal direction are bowed inward toward the interior of the electronic device 101.

A display control microcomputer contained in the processing unit in the electronic device 101 can display various types of information on the liquid crystal monitor 102. In the present embodiment, the size of the available display area of the liquid crystal monitor 102 is approximately seven inches. Although a display panel having a touch panel function with which prescribed operations can be performed by pressing a display surface is used as the liquid crystal monitor 102 in the present embodiment, a display panel that only performs a display function also may be used. Although the liquid crystal monitor 102 is mounted as a display unit in the present embodiment, the present invention is not limited to a liquid crystal monitor as long as a display unit is used that at least can display information such as an organic EL display.

The operation buttons 103 are constituted from a plurality of buttons with which the alphabet and hiragana syllabary, and the like, which generally are used on, e.g., a keyboard of a personal computer, can be input. Although only push-button-type operation buttons are disposed in the present embodiment, the present invention may include a lever-type operating unit, a ball-type operating unit and the like.

The auxiliary operation buttons 104a and 104b are disposed on a side closer to the left lateral face 101e with respect to the liquid crystal monitor 102. Further, an area A1 (one example of a flat portion of the present invention) on which at least a first digit of a user can be positioned is provided between the auxiliary operation buttons 104a and 104b. Various types of operation buttons are not disposed on the area A1. The auxiliary operation buttons 104c to 104e are disposed on a side closer to the right lateral face 101f with respect to the liquid crystal monitor 102. Further, an area A2 (one example of a flat portion of the present invention) on which at least a first digit of a user can be positioned is provided between the auxiliary operation buttons 104d and 104e. Various types of operation buttons are not disposed on the area A2. Thus, by not disposing various types of operation buttons in the areas A1 and A2, erroneous operation caused by a first digit accidentally touching various types of the operation buttons can be prevented when the user holds the electronic device 101 with one or both hands.

In addition, light emitting diodes capable of displaying information on the electronic device 101, such as a power-on state, a remaining battery level and an access state of a storage unit, can be disposed near the area A1 or A2. By disposing the light emitting diodes on portions other than the areas A1 and A2 in the case of disposing light emitting diodes, a luminescent state of the light emitting diodes can be viewed easily because a first digit can be prevented from covering light emitting diodes when a user holds the electronic device 101 with one or both hands.

A bar code reader 106 includes a light emitting unit that emits infrared rays and a light receiving unit that can receive infrared rays reflected by a bar code (not shown).

An imaging unit 107 includes a built-in image-taking device such as a CCD imaging sensor and can take a picture of a subject image and the like.

A processing unit, such as a central processing unit, and a storage unit, such as a semiconductor memory capable of storing various types of information, are provided in the electronic device 101, and the processing unit can perform prescribed information processing when the operating unit such as the operation buttons 103 is operated by a user. Further, the results of processing in the processing unit can be displayed on a display unit such as the liquid crystal monitor 102.

2. Configuration of Back Operation Button

As shown in FIG. 12, a back operation button 105a is disposed on the back face 101b close to the left lateral face 101e. A back operation button 105b also is disposed on the back face 101b close to right lateral face 101f. It is assumed that the electronic device 101 of the present embodiment is held with one or both hands and used (described below); thus, the back operation button 105a is disposed in a position such that it can be operated well with a left hand, and the back operation button 105b is disposed in a position such that it can be operated well with a right hand.

In addition, the shape of the back operation buttons 105a and 105b may be a perfect circle, but may also be an oval as shown in FIG. 12. In the present embodiment, the back face 101b does not include an operating unit other than the back operation buttons 105a and 105b. If the back face 101b includes another operating unit, the other operating unit preferably has a different shape or size from that of the back operation buttons 105a and 105b. With this configuration, a user can identify or distinguish a desired operating unit by touching it with a fingertip without looking at the back face 101b.

In addition, different functions respectively may be assigned to the back operation buttons 105a and 105b or the same function may be assigned. By assigning the same function to the back operation buttons 105a and 105b, the electronic device 101 can be operated held with one hand, and erroneous operation caused by pressing a wrong button will not occur even when held with both hands. In the present embodiment, a trigger function of the bar code reader 106 is assigned to the back operation buttons 105a and 105b. That is, by operating the back operation button 105a or 105b, a control circuit in the electronic device 101 is put into operation, and the bar code reader 106 disposed on the top face 101c can be caused to read a bar code (not shown).

Figure 13:
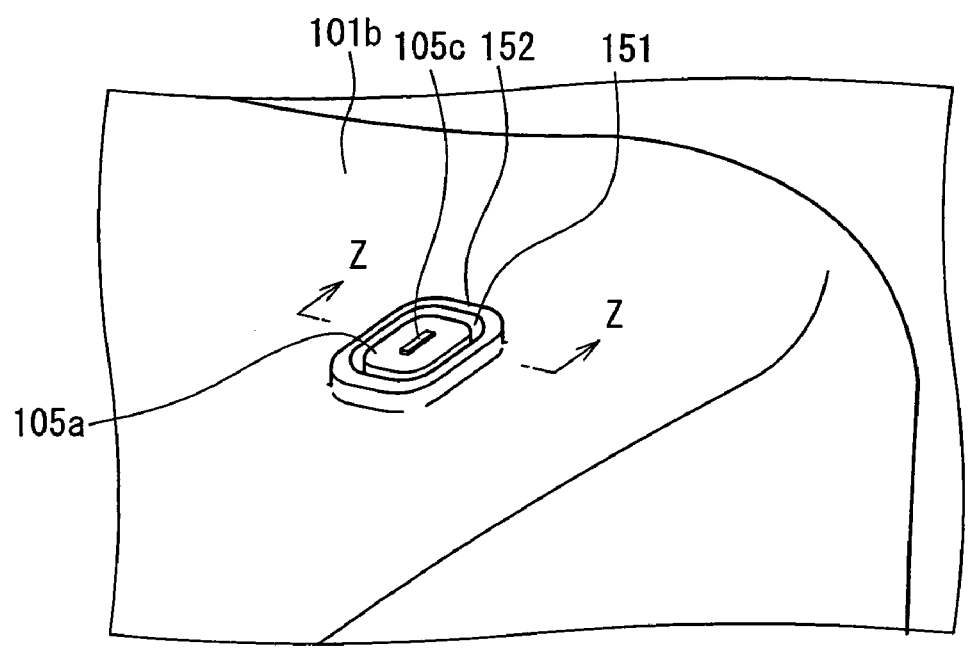
FIG. 13 is a perspective view of a back operation button.
Figure 14:
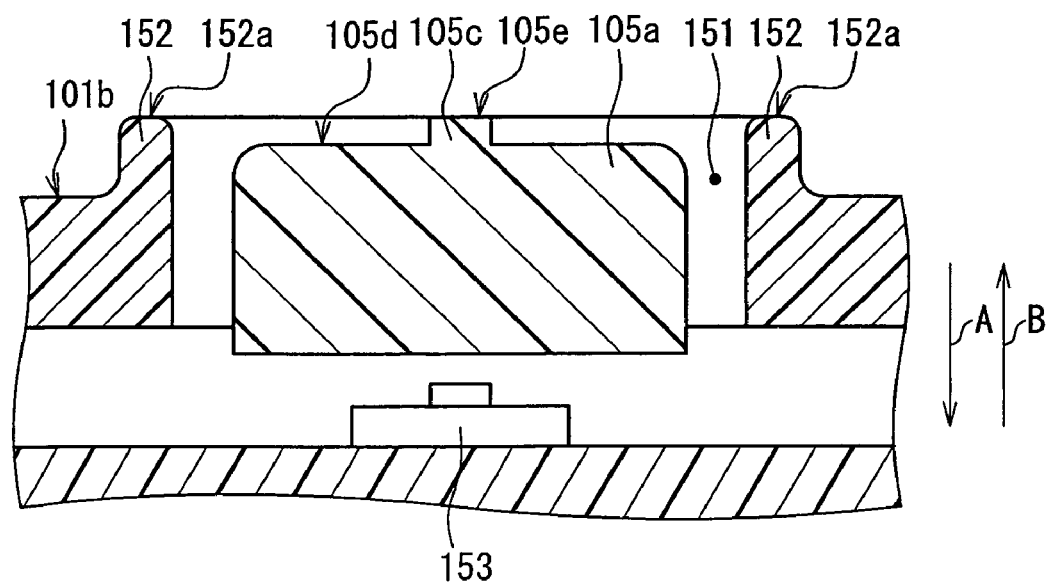
FIG. 14 is a cross-sectional view of a Z-Z portion in FIG. 13.

FIG. 13 is an enlarged perspective view of the back operation button 105a. FIG. 14 is a cross-sectional view of the back operation button 105a and a cross section of a Z-Z portion in FIG. 13. Note that, although only the back operation button 105a is shown in FIG. 13, the back operation button 105b has the same configuration and will not be illustrated or described in detail.

As shown in FIGS. 13 and 14, the back operation button 105a is disposed in an opening portion 151 formed on the back face 101b. The shape of the opening portion 151 is formed so as to be similar to that of the back operation button 105a and is oval in the present embodiment.

The back operation button 105a disposed in the opening portion 151 is shiftable in the directions indicated by arrows A and B. When the back operation button 105a is not pressed or operated, it is positioned as shown in FIG. 14. By being pressed and operated, the back operation button 105a shifts in the direction indicated by the arrow A from the position shown in FIG. 14. Then, the bottom of the back operation button 105a presses a switch element 153 disposed in the bottom of the opening portion 151. When a user removes his/her finger from the back operation button 105a, due to an elastic unit separately provided, the back operation button 105a shifts in the direction indicated by the arrow B, and the position thereof returns to that shown in FIG. 14.

A projection 105c is formed on substantially the center of an operating surface 105d of the back operation button 105a. In the present embodiment, the projection 105c is formed so as to be substantially a quadrangular prism, and the direction of its long side is formed substantially parallel to the longitudinal direction of the oval back operation button 105a. The projection 105c is a member used by a user to distinguish the position of the back operation button 105a by touching it with his/her fingertip. Note that the shape of the projection 105c of the present embodiment is one example, and the shape may be a triangular pole, semi-cylindrical or the like that is at least projecting relative to the surface of the back operation button 105a. Also, the disposed location of the projection 105c is not limited to the central portion of the operating surface 105d of the back operation button 105a.

Further, a projection 152 projecting in a direction perpendicular to the back face 101b is formed around the back operation button 105a on the back face 101b. The projection 152 is formed to surround the perimeter of the back operation button 105a. Note that, the projection 152 is not necessarily formed to surround the entire perimeter of the back operation button 105a. A projection can be provided to only a portion adjacent to the long side portion of the oval back operation button 105a or can be provided to partially surround the perimeter of the back operation button 105a. The shape of the projection 152 is not limited as long as it enables a user to at least distinguish the position by touching it with his/her fingertip when the user cannot see the back face 101b.

Also, as for the projection 152, when the back operation button 105a is in a state as shown in FIG. 14 (non-operational state), the height of a top portion 152a with respect to the back face 101b is the same as or greater than that to the operating surface 105d or a top portion 105e of the projection 105c. By forming the projection 152 as described above, when the electronic device 101 is placed on a flat surface of a desk or the like in a manner such that the back face 101b faces the flat surface, the top portion 152a of the projection 152 comes into contact with the flat surface. At this time, the top portion 105e of the projection 105c does not come into contact with the flat surface, or comes into contact with the flat surface by being pressed just to an extent that does not operate the switch element 153 disposed under the back operation button 105a. Accordingly, since the projection 105c is not pressed with a large amount of force, the back operation button 105a can be prevented from being pressed and operated in the direction indicated by the arrow A due to the self-weight of the electronic device 101, and erroneous operation of the back operation button 106a can be prevented.

3. Method for Holding Electronic Device

The electronic device 101 can be operated when it is placed on a desk or the like and also when it is held with one or both hands.

Figure 15:
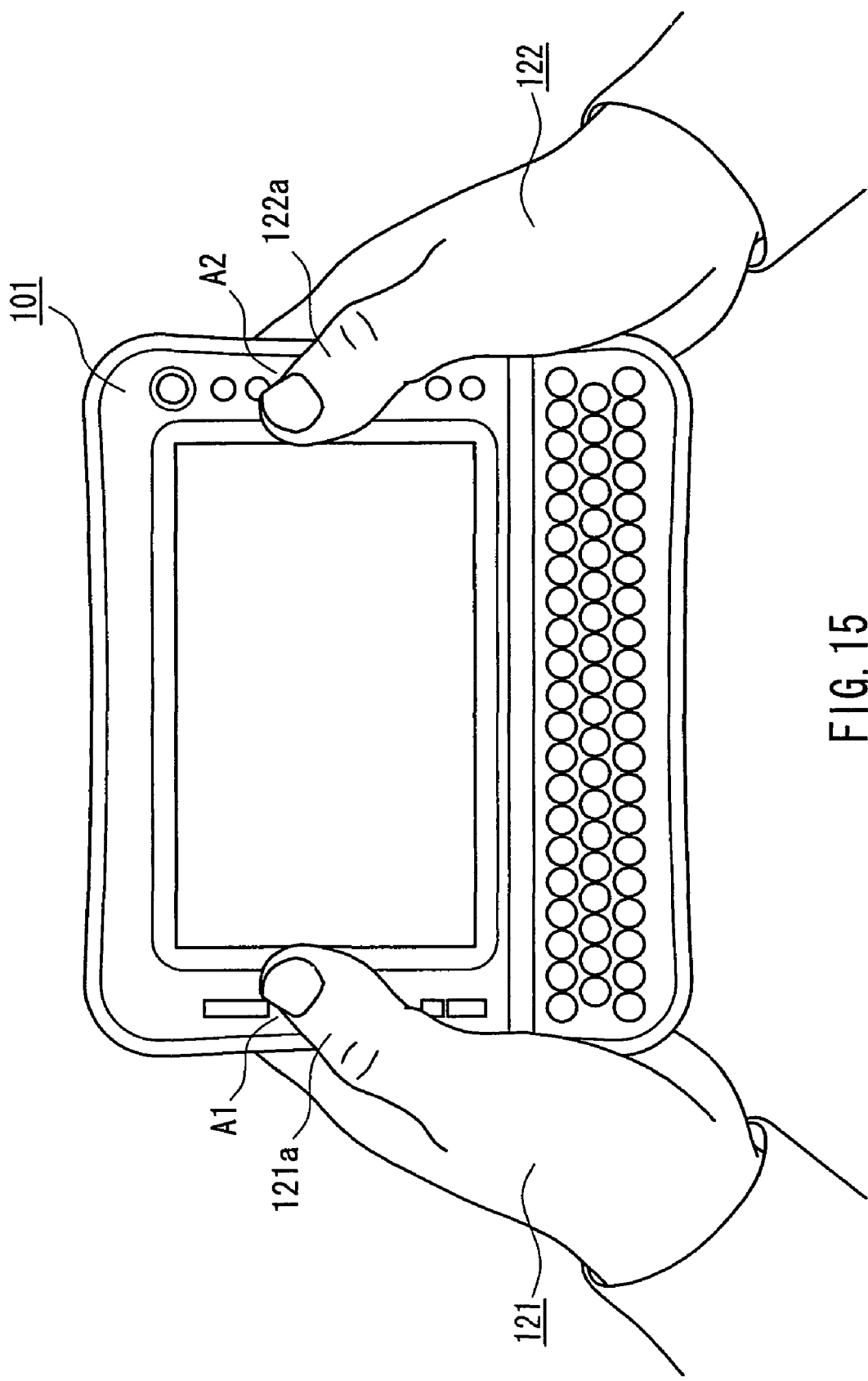
FIG. 15 is a plan view showing a state in which a user is holding an electronic device according to Embodiment 2.
Figure 16:
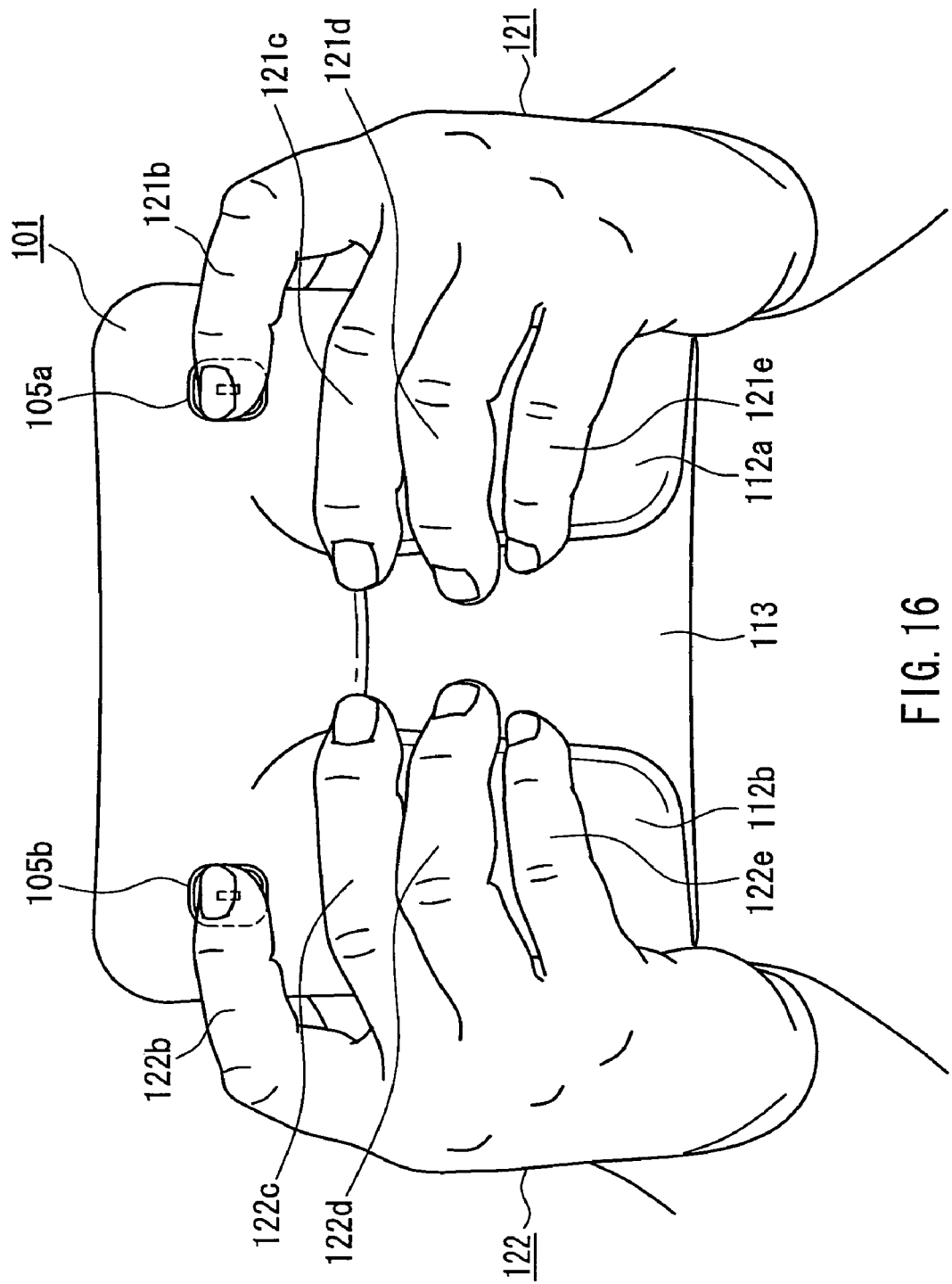
FIG. 16 is a plan view showing a state in which a user is holding an electronic device according to Embodiment 2.

FIG. 15 shows a state in which the electronic device 101 is held with both hands viewed from the front side. FIG. 16 shows a state in which the electronic device 101 is held with both hands viewed from the back side. Hereinafter, a method for holding the electronic device will be described with reference to FIGS. 12 to 16.

As shown in FIG. 12, the back face 101b includes holding portions 112a and 112b in positions close to the left lateral face 101e and the right lateral face 101f.

The holding portions 112a and 112b preferably are formed as projecting curved surfaces. This configuration improves grip-ability because the holding portions 112a and 112b conform better to the fingers of a left hand 121 and a right hand 122. Note that, the holding portions 112a and 112b may also be formed as flat surfaces.

Additionally, a boundary portion between the holding portion 112a and the left lateral face 101e and a boundary portion between the holding portion 112b and the right lateral face 101f preferably are formed as curved surfaces. This configuration improves grip-ability because the boundary portions conform better to portions near the base of the fingers and the palm of the left hand 121 and the right hand 122.

A depressed portion 113 is formed as a depressed shape in the direction perpendicular to the back face 101b with respect to the holding portions 112a and 112b. The depressed portion 113 includes an inner surface 113a adjoining the holding portion 112a and an inner surface 113b adjoining the holding portion 112b. A boundary portion between the inner surface 113a and the holding portion 112a and a boundary portion between the inner surface 113b and the holding portion 112b preferably are formed as curved surfaces. This configuration improves grip-ability because the boundary portions conform better to portions close to the ends of the fingers of the left hand 121 and the right hand 122.

When the electronic device 101 is held with one hand, for example, the left hand 121 as shown in FIG. 15, the palm of the left hand 121 is in contact with a bowed portion 101g of the left lateral face 101e of the electronic device 101; a second digit 121b (index finger), third digit 121c (middle finger), fourth digit 121d (ring finger) and fifth digit 121e (little finger) are positioned on the holding portion 112a on the back face 101b of the electronic device 101; and a first digit 121a (thumb) is positioned on the front face 101a. In addition, on the back face 101b of the electronic device 101, the ends of the second digit 121b to fifth digit 121e (distal ends) are in contact with the inner surface 113a of the depressed portion 113 when the electronic device 101 is held with the left hand 121. Thus, the electronic device 101 is restricted from shifting in a direction that would allow it to leave the hand, and the electronic device 101 can be prevented from being accidentally dropped. When the electronic device 101 is held with the left hand 121, the auxiliary operation button 104a and the like can be operated with the first digit 121a of the left hand 121, and the operation buttons 103 and the like can be operated with the right hand 122, because the right hand 122 is not holding any portions of the electronic device 101. Also, when the electronic device 101 is held with the right hand 122, by positioning the fingers of the left hand 121 in a similar position to the above description, the electronic device 101 can be held and operated.

Further, as shown FIGS. 15 and 16, when the electronic device 101 is held with both hands, it is held in a state in which the palm of the left hand 121 is in contact with the bowed portion 101g of the left lateral face 101e of the electronic device 101; the second digit 121b, third digit 121c, fourth digit 121d and fifth digit 121e are positioned on the holding portion 112a on the back face 101b of the electronic device 101; and the first digit 121a is positioned on the front face 101a. At this time, a portion near the end of the first digit 121a is preferably positioned on the area A1, and erroneous operation of various types of operation buttons can be prevented accordingly. Also, the electronic device 101 is held in a state in which the palm of the right hand 122 is in contact with a bowed portion 101h of the right lateral face 101f of the electronic device 101; the second digit 122b, third digit 122c, fourth digit 122d, and fifth digit 122e are positioned on the holding portion 112b on the back face 101b of the electronic device 101; and the first digit 122a is positioned on the front face 101a. At this time, a portion near the end of the first digit 122a is preferably positioned on the area A2, and erroneous operation of various types of operation buttons can be prevented accordingly.

When the electronic device 101 is held with both hands, by shifting the first digit 121a of the left hand 121 in the surface direction of the front face 101a, the operation buttons disposed on a side near the left lateral face 101e from among the operation buttons 103 and the auxiliary operation buttons 104a and 104b can be operated. Also, by shifting the first digit 122a of the right hand 122 in the surface direction of the front face 101a, the operation buttons disposed on a side near the right lateral face 101f from among the operation buttons 103 and the auxiliary operation buttons 104c to 104e can be operated.

When the electronic device 101 is held with both hands, it usually is held in a state in which the second digit 121b, third digit 121c, fourth digit 121d and fifth digit 121e of the left hand 121 are positioned on the holding portion 112a; and the second digit 122b, third digit 122c, fourth digit 122d and fifth digit 122e of the right hand 122 are positioned on the holding portion 112b. From this state, the second digit 121b of the left hand 121 can be shifted onto the back operation button 105a. Also, the second digit 122b of the right hand 122 can be shifted onto the back operation button 105b. FIG. 16 shows a state in which the second digit 122b of the right hand 122 has been shifted onto the back operation button 105b. In this state, the back operation button 105b can be pressed and operated with the second digit 122b.

When a user's both hands are in a state as shown in FIG. 16, his/her face usually is facing the front face 101a of the electronic device 101. Thus, the user can see the front face 101a, but cannot easily see the back face 101b. Even when the user cannot see the back face 101b as described above, by forming the projection 105c on the back operation buttons 105a and 105b and the projection 152 around the back operation buttons 105a and 105b, the user can distinguish the positions of the back operation buttons 105a and 105b by touching them with his/her fingertip (second digit in the present embodiment).

By pressing and operating the back operation buttons 105a and/or 105b, the switch element 153 disposed under the back operation buttons 105a and/or 105b is turned on, and a prescribed function is implemented. In the present embodiment, the back operation buttons 105a and 105b are respectively assigned to issue the bar code reader 106 with a command to start reading a bar code. Accordingly, by operating at least one of the back operation buttons 105a and 105b, the bar code reader 106 is controlled so as to emit infrared rays, and the bar code reader 106 is controlled so as to receive the infrared rays reflected by the bar code.

In the present embodiment, the back operation buttons 105a and 105b are assigned the same function, but may be assigned a different function from each other, respectively.

Also, the function assigned to the back operation buttons 105a and 105b is not limited to a bar code reading command, but may be another function. For example, a release button function capable of taking a picture of a subject image and the like using the imaging unit 107 disposed on the electronic device 101 may be assigned.

4. Effect of Embodiment, etc

According to the present embodiment, by forming the projection 152 around the back operation buttons 105a and 105b, even when the electronic device 101 is placed in a manner such that the front face 101a faces a flat surface of a desk or the like, erroneous operation of the back operation buttons 105a and 105b caused by the self-weight of the electronic device 101 can be prevented.

Furthermore, according to the present embodiment, by disposing the back operation buttons 105a and 105b on portions close to the left or right ends respectively of the back face 101b, even when the electronic device 101 is held with a left hand, a right hand or both hands, the back operation button 105a or 105b can be reliably operated. Accordingly, usability can be improved.

For example, in a configuration disclosed in JP2002-6988A, an operating unit (operating pad) disposed on a back side of a terminal device is disposed near one corner of the back side. Thus, even if the terminal device is held with both hands and used, it can be operated only with either the left or right hand (only a finger of the right hand in the figure), so it cannot be said to have good operability. Compared to this, as for the electronic device of the present embodiment, the operating unit disposed on the back of the casing can be operated with a left or right hand, and so operability can be improved.

Also, by forming the projections 105c on the back operation buttons 105a and 105b disposed on the back face 101b, and by further forming the projections 152 around the back operation buttons 105a and 105b, a user can easily distinguish the positions of the back operation buttons 105a and 105b by touching them with his or her fingertip (second digit in the present embodiment).

In addition, as shown in FIGS. 15 and 16, as for the back operation buttons 105a and 105b of the present embodiment, when the left lateral face 101e side is held with the left hand 121 and/or the right lateral face 101f side is held with the right hand 122, the back operation buttons 105a and 105b can be found easily and quickly with a fingertip by disposing the back operation buttons 105a and 105b within a range in which the second digits 121b and 122b positioned on the back face 101b can be easily shifted.

Also, by making the projection 152 as high as or higher than the back operation buttons 105a and 105b (height of the projection 105c), even when the electronic device 101 is placed in a manner such that the front face 101a faces a flat surface of a desk or the like, erroneous operation of the back operation buttons 105a and 105b caused by the self-weight of the electronic device 101 can be prevented.

Figure 17:
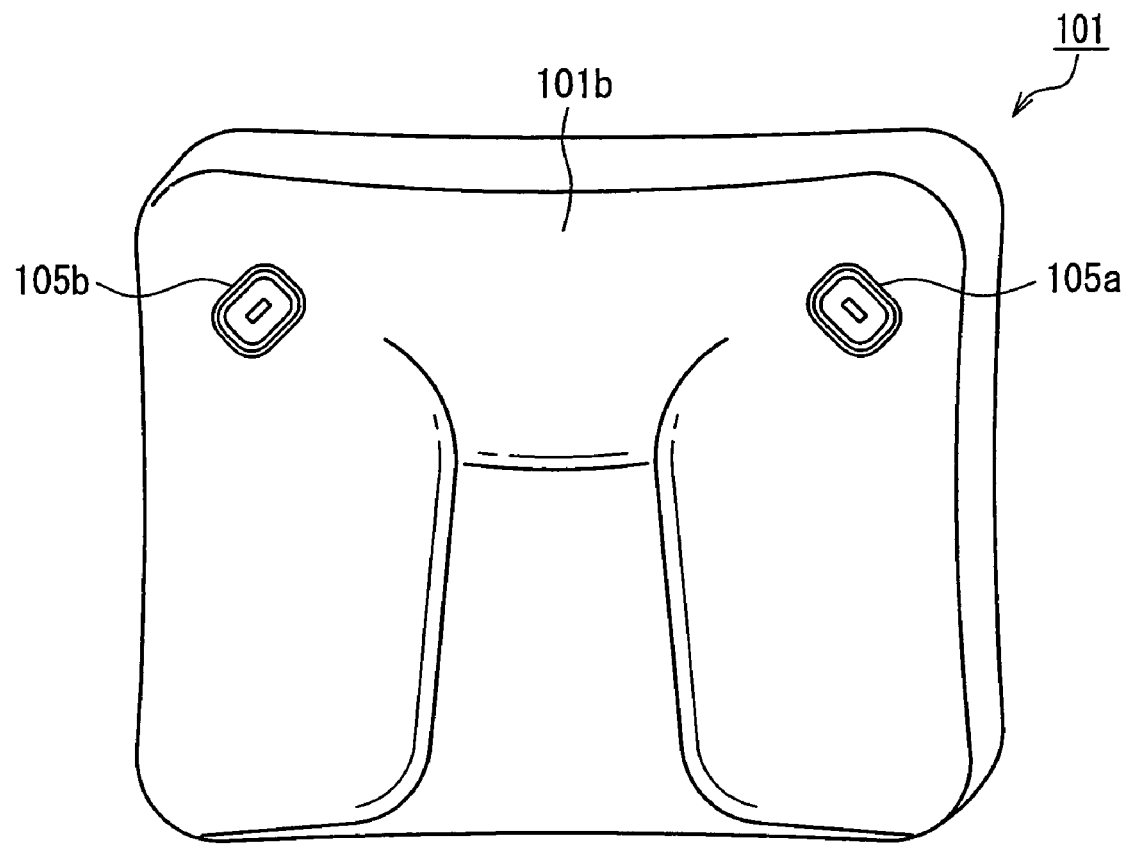
FIG. 17 is a perspective view of the external appearance of another example of an electronic device according to Embodiment 2.

In the present embodiment, although the back operation buttons 105a and 105b are disposed so that the direction of the long side thereof is substantially parallel to the direction along an end portion of the back face 101b adjoining the left lateral face 101e, the buttons may be disposed so as to be inclined at a prescribed angle (e.g. 30 degrees) as shown in FIG. 17. By disposing them as described above, when the electronic device 101 is held with one or both hands, and the second digits 121b and 122b are positioned on the back operation buttons 105a and 105b as shown in FIG. 16, the inclination of the back operation buttons 105a and 105b virtually conforms to that of the second digits 121b and 122b. Accordingly, the back operation buttons 105a and 105b can be operated while keeping the second digits 121b and 122b in a comfortable position, and operability can be improved.

With a configuration assigning the same function to the back operation buttons 105a and 105b, the electronic device 101 can be held with one hand and operated, and erroneous operation (pressing a wrong button) will not occur, even when the device is held with both hands.

Note that in the present embodiment, although both of the projection 105c and the projection 152 are provided, even if only either one of these is provided, the positions of the back operation buttons 105a and 105b can be distinguished without looking at the back face 101b.

Although a PDA is exemplified and described in the present embodiment, the present invention also can be applied to any device that a user can hold and operate. The present invention is useful for personal computers; drives in which a disk medium, such as a DVD, and the like can be mounted; portable disk players, including a hard disk drive and the like; portable navigation systems; medical terminals in which nurses and the like collect inspection data to check the daily condition of a patient; and the like, for example.

The liquid crystal monitor 102 in the present embodiment is an example of a display unit of the present invention. The operation buttons 103 and auxiliary operation buttons 104a to 104e are also examples of main operating units. The back operation buttons 105a and 105b are also examples of sub-operating units. The front face 101a of the casing is also an example of a front main face of the present invention. The back face 101b of the casing is also an example of a back main face of the present invention. The bowed portions 101g and 101h are also examples of bowed portions of the present invention. The projection 152 is also an example of a surrounding projection. The projection 105c is also an example of a projecting portion of the present invention. Also, the operating surface 105d is an example of an operating surface of the present invention. The top portion 152a is also an example of a top portion of the present invention. The depressed portion 113 is also an example of a recessed surface portion of the present invention.

The electronic device of the present invention is useful as a device capable of being handheld and used.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An electronic device comprising:
   a casing that has been formed to be box-shaped comprising a front casing and a back casing;
   a display unit that is disposed on a front main face of the front casing and on which visual information converted from an information signal can be displayed;
   a main operating unit that is disposed on the front main face provided with the display unit;
   a sub-operating unit that is disposed on the back casing; and
   a surrounding projection that is formed around the sub-operating unit in a projecting manner in a direction perpendicular to a back main face of the back casing parallel to the front main face,
   wherein two said sub-operating units are respectively disposed as a pair close to a pair of end sides facing each other on the back main face.

2. The electronic device according to claim 1,
   wherein the sub-operating unit comprises a projecting portion near a central portion of an operating surface for operating the sub-operating unit, the projecting portion being formed higher than the operating surface.

3. The electronic device according to claim 1,
   wherein the surrounding projection comprises a top portion formed so as to be higher than the operating surface of the sub-operating unit with respect to the back main face.

4. The electronic device according to claim 2,
   wherein the surrounding projection comprises a top portion formed so as to be higher than the projecting portion.

5. The electronic device according to claim 1,
   wherein a same function is assigned to the sub-operating units disposed as a pair.

6. The electronic device according to claim 1,
   wherein the back casing comprises a recessed surface portion sunken in a depressed manner with respect to the back main face that is formed on a substantially central portion of the back main face facing the front main face.

* * * * *